(12) United States Patent
Bookbinder et al.

(10) Patent No.: US 11,554,978 B2
(45) Date of Patent: Jan. 17, 2023

(54) METHOD FOR REDUCING PROCESSING TIME FOR OPTICAL FIBER PREFORMS

(71) Applicant: Corning Incorporated, Corning, NY (US)

(72) Inventors: Dana Craig Bookbinder, Corning, NY (US); Richard Michael Fiacco, Corning, NY (US); Ming-Jun Li, Horseheads, NY (US); Jeffery Scott Stone, Addison, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/546,020

(22) Filed: Nov. 18, 2014

(65) Prior Publication Data
US 2015/0143852 A1    May 28, 2015

Related U.S. Application Data

(60) Provisional application No. 61/909,664, filed on Nov. 27, 2013.

(51) Int. Cl.
   *C03B 37/014* (2006.01)
(52) U.S. Cl.
   CPC .. *C03B 37/01446* (2013.01); *C03B 37/01453* (2013.01); *C03B 37/01473* (2013.01)
(58) Field of Classification Search
   CPC .................................................. C03B 37/01446
   See application file for complete search history.

(56) References Cited

U.S. PATENT DOCUMENTS

| | | | |
|---|---|---|---|
| 4,125,388 A | 11/1978 | Powers | |
| 4,251,251 A | 2/1981 | Blankenship | |
| 4,263,031 A * | 4/1981 | Schultz | C03B 37/01446 65/30.1 |
| 4,349,373 A * | 9/1982 | Sterling | C03B 37/0183 427/137 |
| 4,362,545 A | 12/1982 | Bailey et al. | |
| 4,486,212 A | 12/1984 | Berkey | |
| 4,629,485 A | 12/1986 | Berkey | |
| 4,684,383 A | 8/1987 | Cavender, Jr. et al. | |
| 4,749,396 A * | 6/1988 | Hicks, Jr. | C03B 37/01211 65/412 |
| 4,784,465 A | 11/1988 | Berkey | |

(Continued)

FOREIGN PATENT DOCUMENTS

| | | |
|---|---|---|
| CN | 1561586 A | 1/2005 |
| CN | 1984850 A | 6/2007 |

(Continued)

OTHER PUBLICATIONS

International Search Report issued in connection with corresponding PCT application No. PCT/US2014/066849 dated Mar. 12, 2015.

(Continued)

*Primary Examiner* — Lisa L Herring
(74) *Attorney, Agent, or Firm* — Kevin L. Bray

(57) ABSTRACT

A method for forming an optical glass preform from a soot preform is provided. The method includes forming a soot preform, placing the soot preform in a furnace, and applying a vacuum through a centerline hole of the soot preform.

10 Claims, 21 Drawing Sheets

(56) References Cited

U.S. PATENT DOCUMENTS

| | | | |
|---|---|---|---|
| 4,820,322 A * | 4/1989 | Baumgart | C03B 23/076 |
| | | | 65/412 |
| 5,116,400 A | 5/1992 | Abbott et al. | |
| 5,236,481 A | 8/1993 | Berkey | |
| 5,356,449 A * | 10/1994 | Kuwahara | C03B 37/01446 |
| | | | 65/435 |
| 5,396,322 A | 3/1995 | Lawrence | |
| 5,788,734 A | 8/1998 | Hoshino et al. | |
| 6,263,706 B1 | 7/2001 | Deliso et al. | |
| 6,418,757 B1 | 7/2002 | Berkey et al. | |
| 6,422,042 B1 * | 7/2002 | Berkey | C03B 37/01473 |
| | | | 65/412 |
| 6,477,305 B1 | 11/2002 | Berkey et al. | |
| 6,904,772 B2 | 6/2005 | Berkey et al. | |
| 7,672,557 B2 | 3/2010 | Allen et al. | |
| 8,132,429 B2 | 3/2012 | Pedrido | |
| 8,464,556 B2 * | 6/2013 | Bookbinder | C03B 37/0142 |
| | | | 65/413 |
| 2002/0005051 A1 | 1/2002 | Brown et al. | |
| 2002/0181076 A1 | 12/2002 | Bickham et al. | |
| 2004/0107734 A1 | 6/2004 | Kenkare et al. | |
| 2007/0104437 A1 * | 5/2007 | Bookbinder | C03B 37/01446 |
| | | | 65/412 |
| 2010/0122558 A1 | 5/2010 | Jewell et al. | |
| 2010/0310219 A1 | 12/2010 | Bookbinder et al. | |
| 2011/0074065 A1 | 3/2011 | Batchelder et al. | |
| 2011/0100064 A1 | 5/2011 | Sarkar et al. | |
| 2012/0118019 A1 | 5/2012 | Takahashi et al. | |
| 2014/0186645 A1 | 7/2014 | Briere et al. | |
| 2015/0143852 A1 | 5/2015 | Bookbinder et al. | |

FOREIGN PATENT DOCUMENTS

| | | |
|---|---|---|
| EP | 0578244 | 12/1994 |
| JP | 2003137584 | 5/2003 |
| WO | 00/64825 | 11/2000 |
| WO | 02/28790 | 4/2002 |
| WO | 200249977 | 6/2002 |
| WO | 2005/102946 A1 | 11/2005 |
| WO | 2005/102947 A1 | 11/2005 |
| WO | 2007059336 | 5/2007 |

OTHER PUBLICATIONS

Brown et al., "Determination of Silicon, Germaniun, and Tin in Their Volatile Organo Compounds", Analytical Chemistry, vol. 30, No. 10, Oct. 1958, pp. 1689-1691.

Cogniolate, "Chemical Vapour Deposition for Optical Fibre Technology", Journal De Physique IV, Colloque C5, supplement au Journal de Physique II, vol. 5, Jun. 1995, pp. C5-975-C5-987.

Khopin, et al., "Doping of Optical Fiber Preforms via Porous Silica Layer Infiltration with Salt Solutions", Inorganic Materials, vol. 41, No. 3, 2005, pp. 303-307.

Logunov et al., "Light diffusing optical fiber for illumination", Renewable Energy and the Environment Congress, Nov. 3-7, 2013, DT3E.4.

* cited by examiner

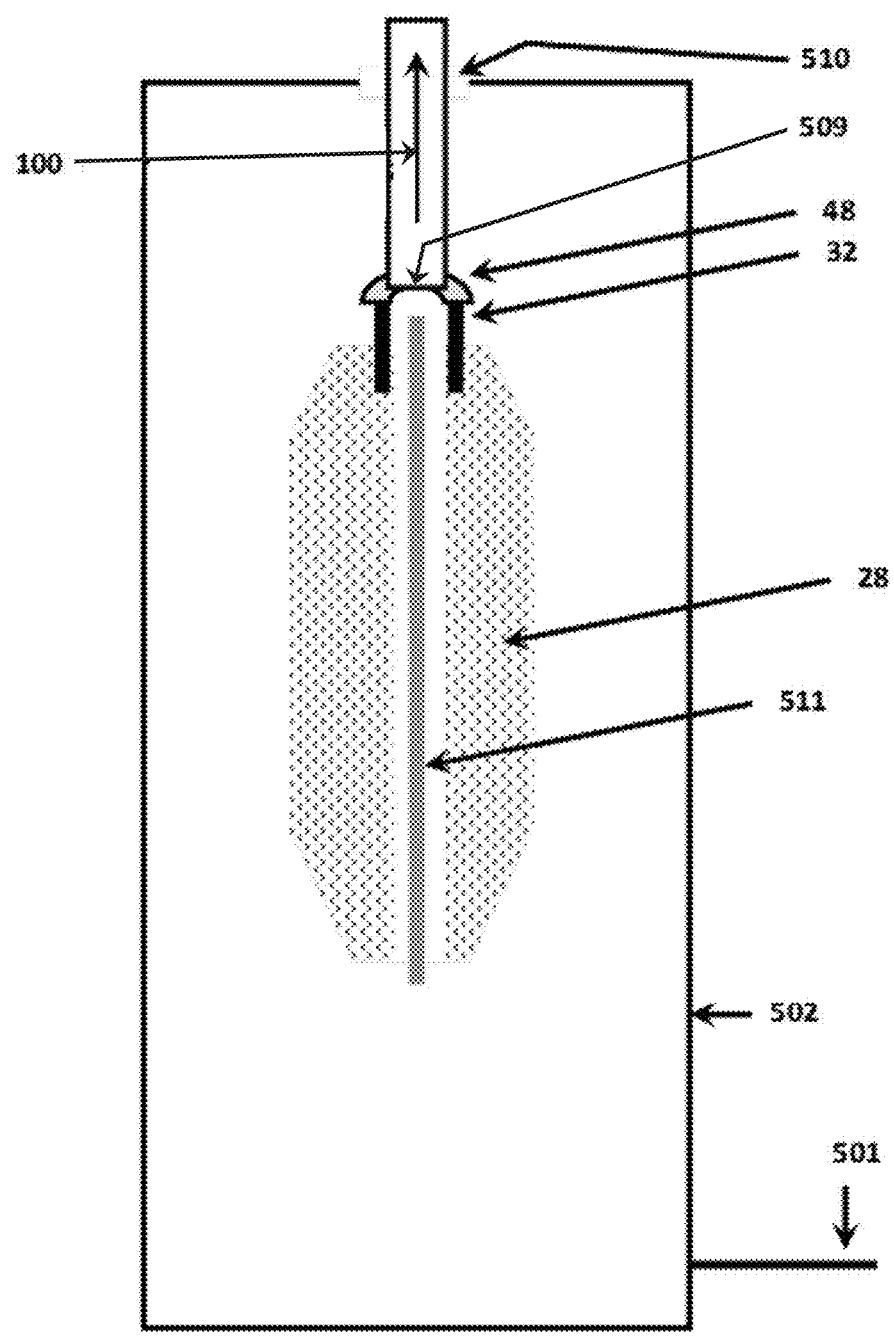

METHOD FOR REDUCING PROCESSING TIME FOR OPTICAL FIBER PREFORMS

This application claims the benefit of priority under 35 U.S.C. § 119 of U.S. Provisional Application Ser. No. 61/909,664 filed on Nov. 27, 2013, the content of which is relied upon and incorporated herein by reference in its entirety.

FIELD

The present disclosure relates to a method that reduces processing periods for forming optical fiber preforms.

BACKGROUND

Soot preforms are commonly used in optical fiber manufacturing. The soot preforms may include a single segment, for example, a soot core preform. Alternatively, soot preforms may include two segments, where the first segment is an inner glass core cane, and the second segment is either a soot overclad deposited directly on the glass core cane, or a soot overclad sleeve that is sintered and collapsed on the glass core cane in, for example, a rod-in-soot process. Soot preforms may also include more than two soot segments. For example, a first segment may be a soot core, and additional segments may be soot overclad segments formed using soot-on-soot processes.

Making optical fiber glass preforms that are free of defects, and that can be readily processed, has conventionally been a time consuming process. Slow steps in the process include heating, drying, doping and sintering steps. Soot preforms, such as those described above, may be sintered very slowly in a furnace at approximately atmospheric pressure (for example, about 1.0 atmosphere pressure, absolute) in order to produce a consolidated glass preform that is free of seeds or bubbles. For example, temperature ramp rates during sintering may be less than about 10° C. per minute. While the sintering period can be reduced by using a high permeability sinter gas such as, but not limited to, helium (in contrast to low permeability gases such as, but not limited to, nitrogen, argon and oxygen), the sintering period remains relatively long because in order to ensure that void gas is not trapped in the consolidated glass preform.

As the soot preform is sintered, the pores transition from open pores to closed pores, and sintering rates must be reduced so that gas does not become trapped in the closed pores. Even after the pores have been closed, additional processing steps are often completed to diffuse gas out of the consolidated glass preform. Diffusion of the gas avoids the formation of gas seeds at high temperatures associated with drawing the consolidated glass preforms into optical fiber. Conventionally, diffusion of gas that is dissolved in the glass preform during sintering may be accomplished by placing consolidated glass preforms in holding ovens at temperatures ranging from about 800° C. to about 1,200° C. While the period in a holding oven for interstitial gas to diffuse out of the glass preform increases with increasing glass preform size, it is common for the glass preform to remain in the holding oven for more than about 1.0 hour, and in some instances, for as long as about 100 hours or more. For example, as discussed further below, it may take between about 4.0 hours and about 8.0 hours in a holding oven for interstitial gas to diffuse out of a glass preform having a mass of about 3,000 grams. As a further example, it may take greater than about 50 hours in a holding oven for interstitial gas to diffuse out of a glass preform having a mass of about 45 kilograms.

The combination of the time to perform steps in the making of optical fiber glass preforms results in very long processing times for the optical fiber preforms, which negatively impacts the cost of manufacturing optical fiber.

SUMMARY

According to an embodiment of the present disclosure, a method for forming an optical glass preform from a soot preform is provided. The method includes forming a soot preform, placing the soot preform in a furnace, and applying a vacuum through a centerline hole of the soot preform.

According to another embodiment of the present disclosure, a method for forming an optical glass preform from a soot preform is provided. The method includes forming a soot preform and placing the soot preform in a furnace. The method further includes sintering the outside surface of the soot preform to form a glazed soot preform, applying a vacuum through a centerline hole of the soot preform, and sintering the glazed soot preform under vacuum to form a consolidated glass preform.

Embodiments of the present disclosure are directed to methods that significantly reduce the time for processing soot preforms to form glass preforms for subsequent use in the manufacture of optical fibers. The embodiments disclosed herein significantly reduce the process times for the steps of heating, drying, doping and sintering of the preform, and the step of diffusing gas from the consolidated glass preform.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which:

FIG. 6A illustrates a soot preform having a core cane and a soot overclad segment in a furnace in accordance with an embodiment of the present disclosure;

DETAILED DESCRIPTION

Figure 1:
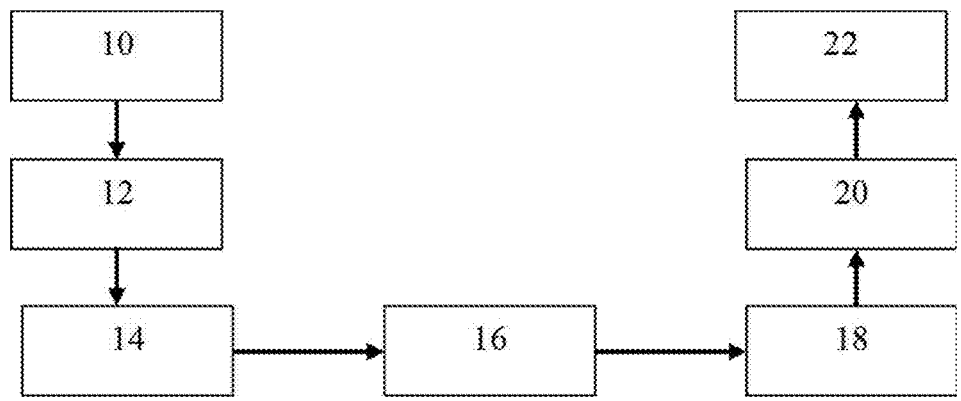
FIG. 1 is a flow chart of a process in accordance with an embodiment of the present disclosure.

Reference will now be made in detail to the present embodiment(s), example(s) of which is/are illustrated in the accompanying drawings. Whenever possible, the same reference numerals will be used throughout the drawings to refer to the same or like parts.

The singular forms "a" "an" and "the" include plural referents unless the context clearly dictates otherwise. The endpoints of all ranges reciting the same characteristic are independently combinable and inclusive of the recited endpoint. All references are incorporated herein by reference.

As used herein, the term "soot" refers to silica or doped silica particles having dimensions of about 5.0 nm to about 5.0 microns. The term "preform" refers to an article that may be used in making an optical glass article, an optical preform, an optical fiber preform and/or that may be drawn into an optical fiber. The term "consolidate" refers to a process where a soot preform, or a portion of a soot preform, is heat treated to form a closed porosity glass preform or a closed porosity portion of a glass preform. Also herein, numeral 28 designates a soot preform that has not been glazed or consolidated, a soot preform that has not been glazed or consolidated is also referred to herein as a first soot preform; numeral 28b designates a glazed soot preform that has not been consolidated; and numeral 29 designates a consolidated glass preform.

The present disclosure is directed to a process for converting soot preforms into glass preforms that may be subsequently drawn into optical fiber. FIG. 1 illustrates a process in accordance with an embodiment of the present disclosure. While FIG. 1 illustrates one or more steps, and similar steps are described throughout the present disclosure, it is not intended to limit the present disclosure to the embodiment illustrated in FIG. 1. It may not be necessary to perform all steps illustrated in FIG. 1 in order to achieve the desired advantages of the present disclosure. Similarly, alternate embodiments may include other steps described below, but not illustrated in FIG. 1. Furthermore, while FIG. 1 illustrates an order, the steps need not be performed in the disclosed order, although in some examples, an order may be preferred. FIGS. 5A-5J, 6A-6C, 7A-7C and 8A-8D illustrate the formation of a soot preform and are discussed below in relation to the process illustrated in FIG. 1. It should be appreciated that FIGS. 5A-5J, 6A-6C, 7A-7C and 8A-8D are merely exemplary embodiments and are not intended to limit the process steps illustrated in FIG. 1 to any single embodiment disclosed herein.

At step 10, a soot preform 28 is prepared using, for example, but without limitation, an outside vapor deposition (OVD) process such as is described in U.S. Pat. Nos. 4,784,465 and 6,477,305, the specifications of which are incorporated by reference in their entirety. Other chemical vapor deposition (CVD) processes such as vapor axial deposition (VAD) may also be used for making soot preforms disclosed herein.

Figure 5A:
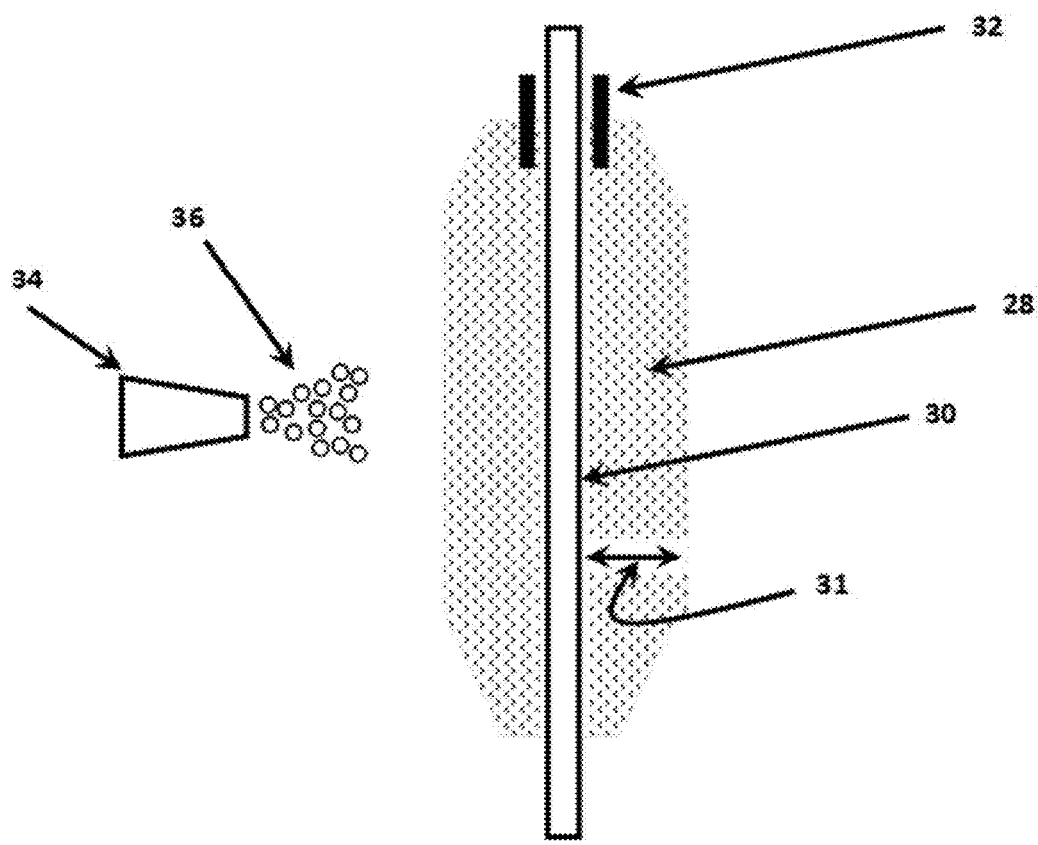
FIG. 5A illustrates a soot preform and mandrel assembly in accordance with an embodiment of the present disclosure.

As is shown in FIG. 5A, a silica-based reaction product, or soot 36, is formed by reacting at least one glass-forming precursor compound in an oxidizing atmosphere, such as in burner 34. Soot 36 used to form soot preform 28 may be made by chemically reacting at least one glass-forming precursor compound in an oxidizing atmosphere. The glass-forming precursor compound can be for example, but without limitation, a pure silica product precursor such as $SiCl_4$ or octamethylcyclotetrasiloxane (OMCTS). Soot 36 may also be made by simultaneous reaction of at least one glass-forming precursor compound and at least one dopant precursor compound in an oxidizing atmosphere. Dopant precursor compounds such as, but not limited to, $GeCl_4$, $TiCl_4$, $POCl_3$ and $AlCl_3$, may be used.

Soot preform 28 may include a single segment or multiple segments. For example, soot preform 28 may include a core region and at least one cladding segment. Alternatively, soot preform 28 may include a core region, a trench, and at least one cladding region overlaying the core/trench regions.

According to another embodiment, soot preform 28 may include multiple segments formed by a soot pressing process.

As is further illustrated in FIG. 5A, a mandrel 30 is inserted into a handle 32 and mounted on a lathe (not illustrated). The lathe rotates and translates mandrel 30 in close proximity with burner 34. As mandrel 30 is rotated and translated, soot 36 is directed toward mandrel 30. During formation of soot preform 28, at least a portion of soot 36 is deposited on mandrel 30 and on a portion of handle 32. Alternatively, instead of rotating and translating mandrel 30, the lathe rotates mandrel 30 and handle 32 and burner 34 translates along a length of soot preform 28 and a portion of handle 32.

Once formed on mandrel 30, soot wall thickness 31 of soot preform 28 may be determined. Soot wall thickness 31 may be measured from the outside surface of soot preform 28 to the surface of mandrel 30. After deposition of soot 36 is completed, mandrel 30 is removed from soot preform 28. Removal of mandrel 30 leaves a centerline hole 504 in soot preform 28. After removal of mandrel 30, handle 32 and soot preform 28 remain attached together. As illustrated in FIG. 5C, soot preform 28 and attached handle 32 may be mated to vacuum connection 509 and placed in a muffle furnace 502. Seal 48 is formed between vacuum connection 509 and an upper portion of handle 32.

Handle 32 may have a design that facilitates drawing of a vacuum 100. For example, handle 32 may have a hollow portion through which gas may flow from soot preform 28 to vacuum connection 509 and out of furnace 502. Where soot preform 28 includes an inner glass core cane, handle 32 may be welded to the glass core cane. Alternatively, handle 32 may be situated around the inner glass core cane having a second diameter to form a handle assembly having a gap between the handle and the glass core cane. In such a design, inner diameter of handle 32 may be greater than outer diameter of the glass core cane. During processing, gas may flow from soot preform 28 through the gap between the handle and the glass core cane, to vacuum connection 509, and out of furnace 502.

According to embodiments of the present disclosure, when vacuum 100 is drawn through centerline hole 504, the furnace pressure ($F_p$) outside of soot preform 28 may be greater than the pressure inside of soot preform 28, and particularly in centerline hole 504. For example, when vacuum 100 is drawn through centerline hole 504, the pressure inside soot preform 28 may be less than or equal to about 0.25 $F_p$. As a further example, $F_p$ may be about 1.0 atmosphere pressure, absolute.

At step 12, soot preform 28 is heated and/or dried. The preform may be suspended in a furnace, heated and treated with a drying agent. Exemplary drying agents include, without limitation, chlorine-containing compounds such as chlorine ($Cl_2$), silicon tetrachloride ($SiCl_4$), thionyl chloride ($SOCl_2$) and carbonyl chloride ($COCl_2$), or carbon monoxide (CO). The drying agent may also be a chlorine-containing compound/helium (He) mixture in a volume/volume ratio of about 0.1/10 to about 1/10 V/V. Drying may be carried out under an atmosphere of helium at temperatures of about 800° C. to about 1,300° C. for a period of about 1.0 hour to about 5.0 hours. A vacuum 100 may also be applied to centerline hole 504 to facilitate heating of the preform and/or flow of the drying agent through soot preform 28 and to shorten the period for heating and/or drying soot preform 28. Vacuum 100 applied to centerline hole 504 may result in a flow rate of gas through centerline hole 504 of greater than about 100 sccm (standard cubic centimeters per second). The flow rate of gas through centerline hole 504 may even be greater than about 1,000 sccm.

At step 14, soot preform 28 is partially sintered by heating soot preform 28 to temperatures of about 1,200° C. to about 1,600° C. under an atmosphere of helium. Soot preform 28 is heated from the outside such that the outside surface of soot preform 28 sinters first. Thus, a sealed portion, or a glazed layer 35, may be formed on the outside of glazed soot preform 28b. Glazed layer 35 is a closed porosity layer formed on the outside surface of glazed soot preform 28b. Alternatively, the outside of glazed soot preform 28b may be a layer of fully densified glass, for example, void-free glass. Glazed layer 35 may be, for example, less than the entirety of soot preform 28. Glazed layer 35 may have a thickness of less than about 25% of the thickness of soot preform 28, or less than about 15% of the thickness of soot preform 28, or less than about 5.0% of the thickness of soot preform 28, or even less than about 3.0% of the thickness of soot preform 28. Glazed layer 35 may, for example, have a thickness of less than about 2.0 cm.

At any, or all, of steps 12, 14, 16 and 18, soot preform 28 may be doped. Soot preform 28 may be suspended in a furnace, heated and treated with a doping agent. Exemplary doping agents include, without limitation, chlorine-containing compounds such as chlorine ($Cl_2$), silicon tetrachloride ($SiCl_4$), thionyl chloride ($SOCl_2$) and carbonyl chloride ($COCl_2$), and hexachloroethane ($C_2Cl_6$), fluorine-containing compounds such as silicon tetrafluoride ($SiF_4$), carbon tetrafluoride ($CF_4$,), hexafluoroethane ($C_2F_6$) and sulfur hexafluoride ($SF_6$), and carbon monoxide (CO). The doping agents described above may also be combined with helium (He) to form a mixture in a volume/volume ratio of about 0.1/10 to about 1/10 V/V. Doping may be carried out under an atmosphere of helium at temperatures of about 800° C. to about 1,400° C. for a period of about 1.0 hour to about 5.0 hours. A vacuum 100 may also be applied to centerline hole 504 to facilitate heating of the preform and/or flow of the doping agent through soot preform 28 and to shorten the period for heating and/or doping soot preform 28. Vacuum 100 applied to centerline hole 504 may result in a flow rate of gas through centerline hole 504 of greater than about 100 sccm. The flow rate of gas through centerline hole 504 may even be greater than about 1,000 sccm.

According to an embodiment of the present disclosure, thickness of glazed layer 35 may be controlled such that densification of soot preform 28 is limited. Controlling densification may include moving soot preform 28 through a hot zone having temperatures between about 1,000° C. and about 1,600° C. at a ramp rate of greater than about 12.5° C. per minute, or greater than about 25° C. per minute, or even greater than about 50° C. per minute. Moving soot preform 28 through a hot zone confines heating to the outside surface of soot preform 28 and limits heating of other portions of soot preform 28. However, moving soot preform 28 through a hot zone may also limit heating of the outside surface of soot preform 28, and more than one pass of soot preform 28 through the hot zone may be made to form glaze layer 35.

Figure 5B:
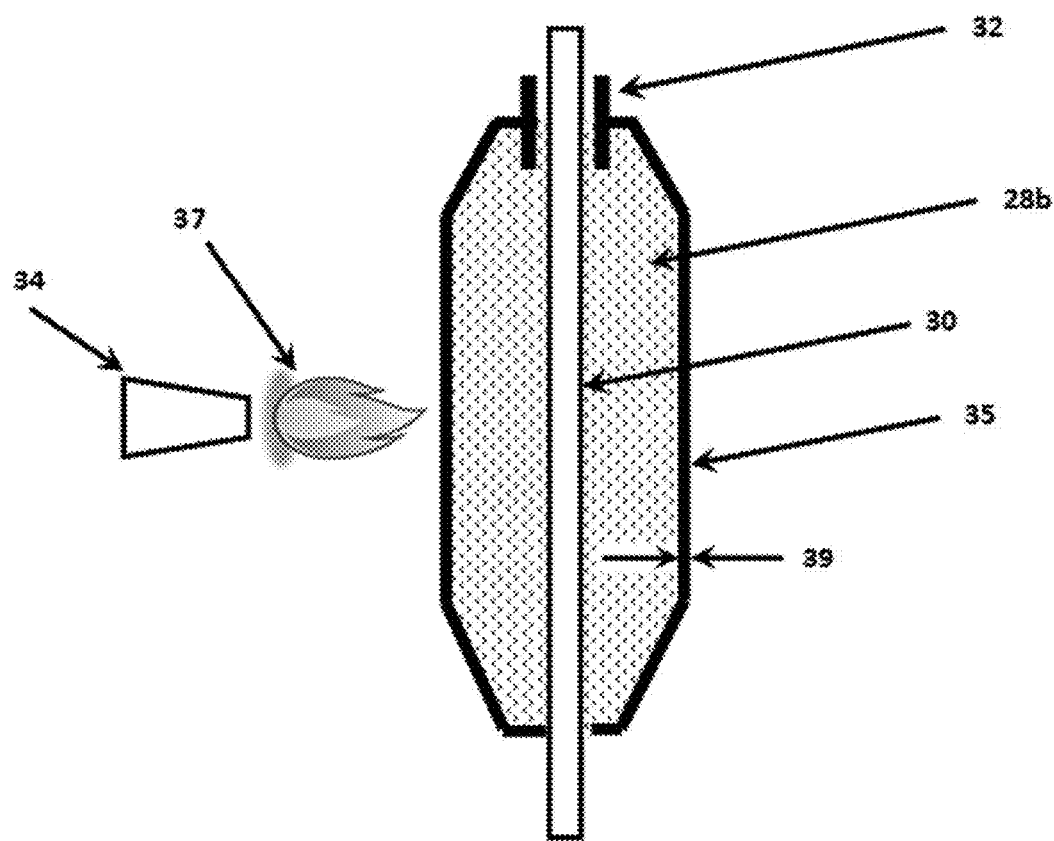
FIG. 5B illustrates a glazed soot preform in accordance with an embodiment of the present disclosure.
Figure 5C:
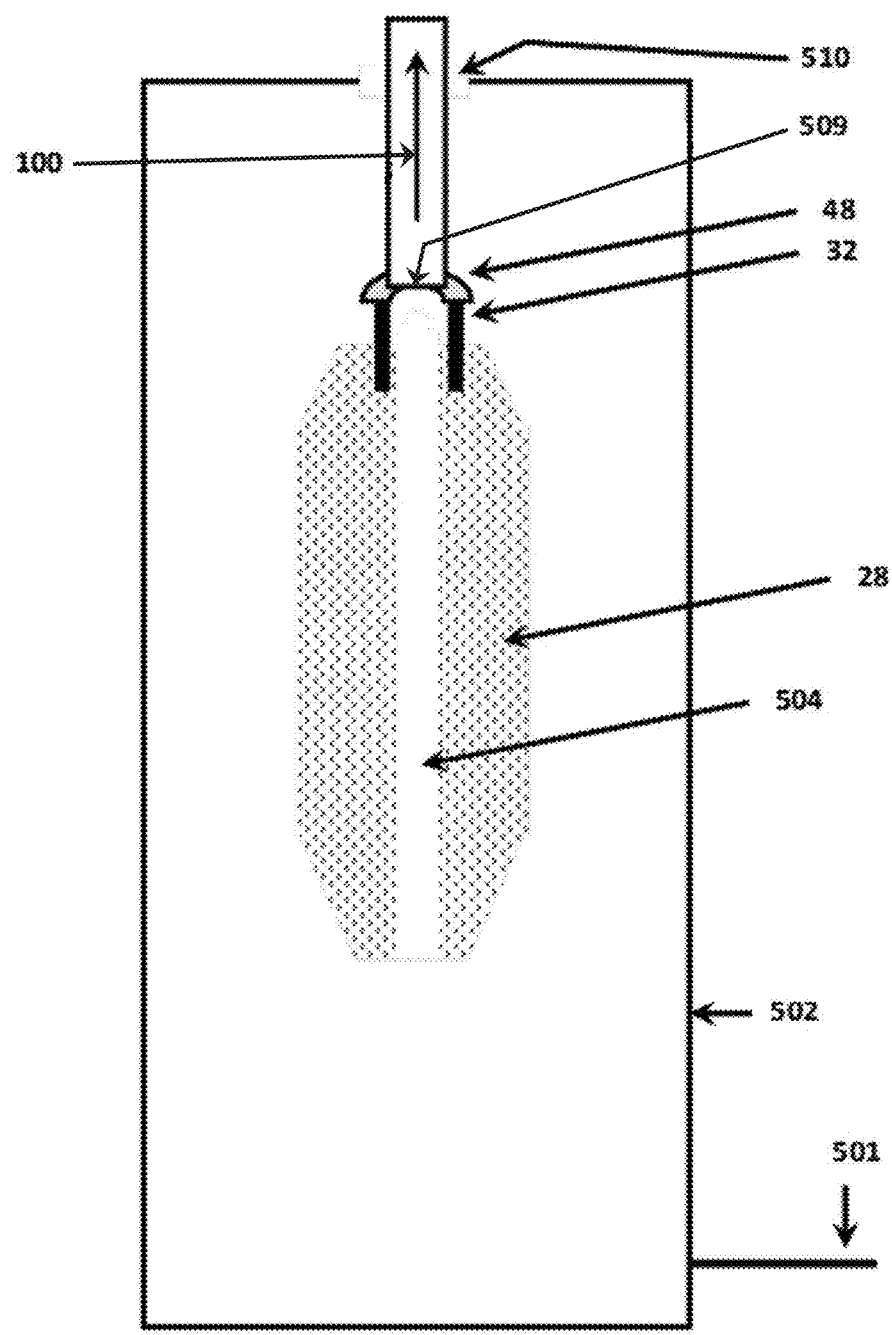
FIG. 5C illustrates a soot preform in a furnace in accordance with an embodiment of the present disclosure.
Figure 5D:
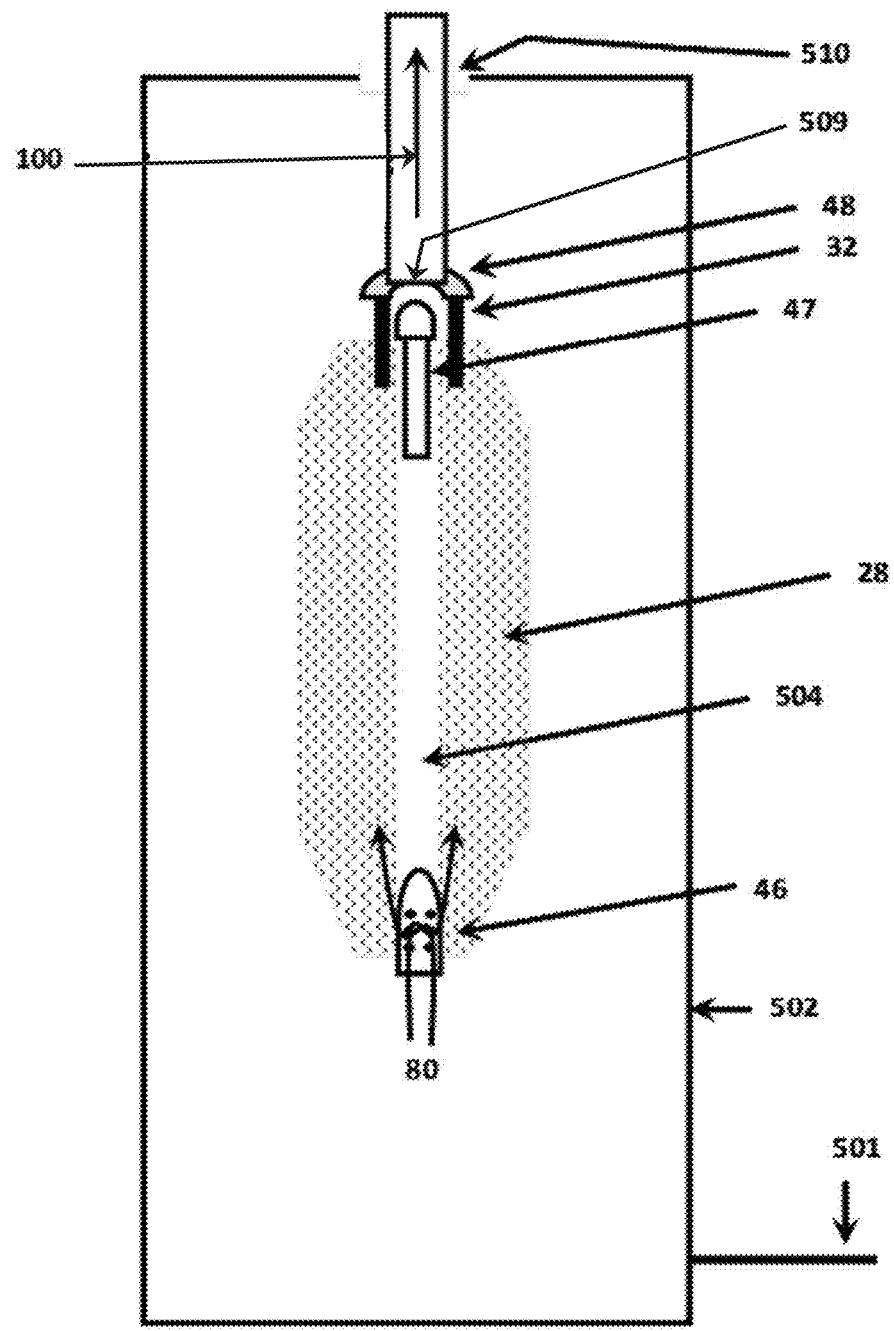
FIG. 5D illustrates a soot preform, a top plug, and a porous bottom plug in a furnace, in accordance with an embodiment of the present disclosure.
Figure 5E:
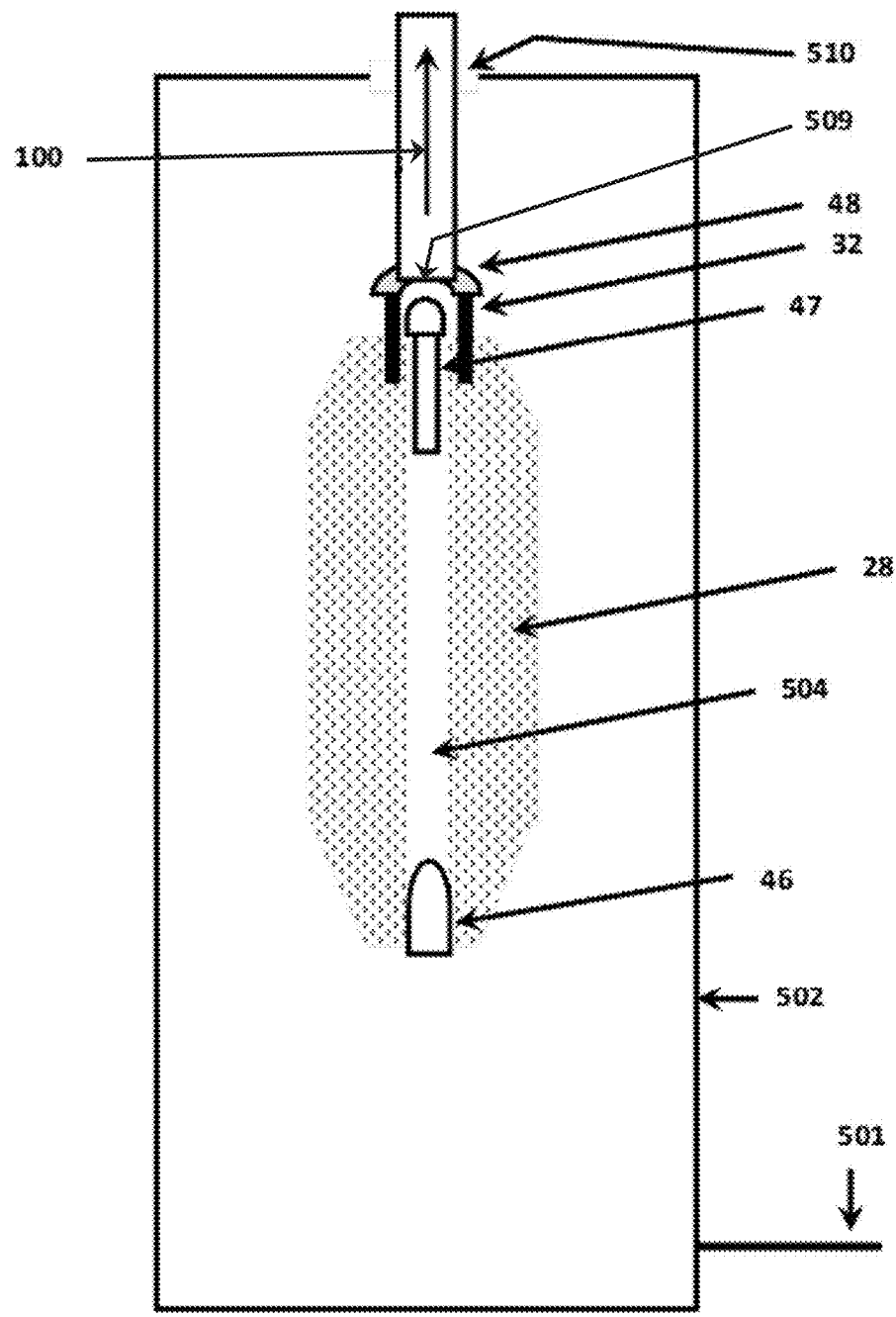
FIG. 5E illustrates a soot preform, a top plug and a non-porous bottom plug in a furnace, in accordance with an embodiment of the present disclosure.

FIG. 5D illustrates an embodiment in which a bottom plug 46 is placed in centerline hole 504 at the end of soot preform 28 distal to handle 32, and a top plug 47 is placed in centerline hole 504 at the end of soot preform 28 proximal to handle 32. As shown, bottom plug 46 may be porous and top plug 47 may be non-porous, or solid. One exemplary porous bottom plug 47 is shaped like a test tube, except that the bottom of the tube, which normally might hold a liquid, includes openings in at least a portion of bottom plug 46 that is inserted into centerline hole 504 and contacts an inner surface of soot preform 28. FIG. 5D also shows gas flow 80 from furnace 502 through porous bottom plug 46, into centerline hole 504 and into soot preform 28 when vacuum 100 is applied to centerline hole 504. As shown in FIG. 5E bottom plug 46 may also be non-porous, or solid. As described herein, bottom plug 46 and top plug 47 may be of any material suitable for high temperatures associated with converting soot preforms into glass preforms. For example, bottom plug 46 and top plug 47 may be, but are not limited to, glass plugs.

Figure 5F:
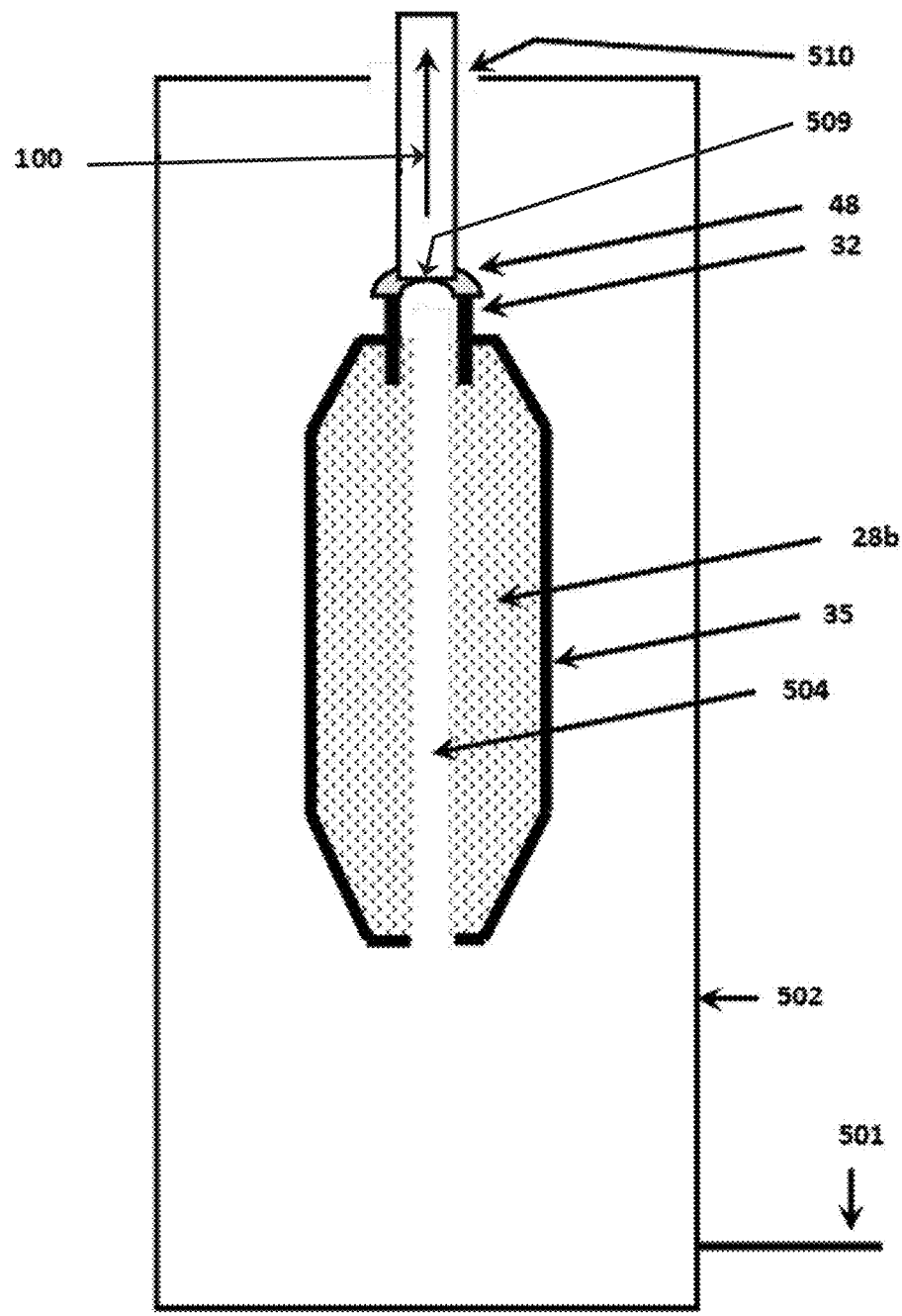
FIG. 5F illustrates a glazed soot preform in a furnace, in accordance with an embodiment of the present disclosure.
Figure 5G:
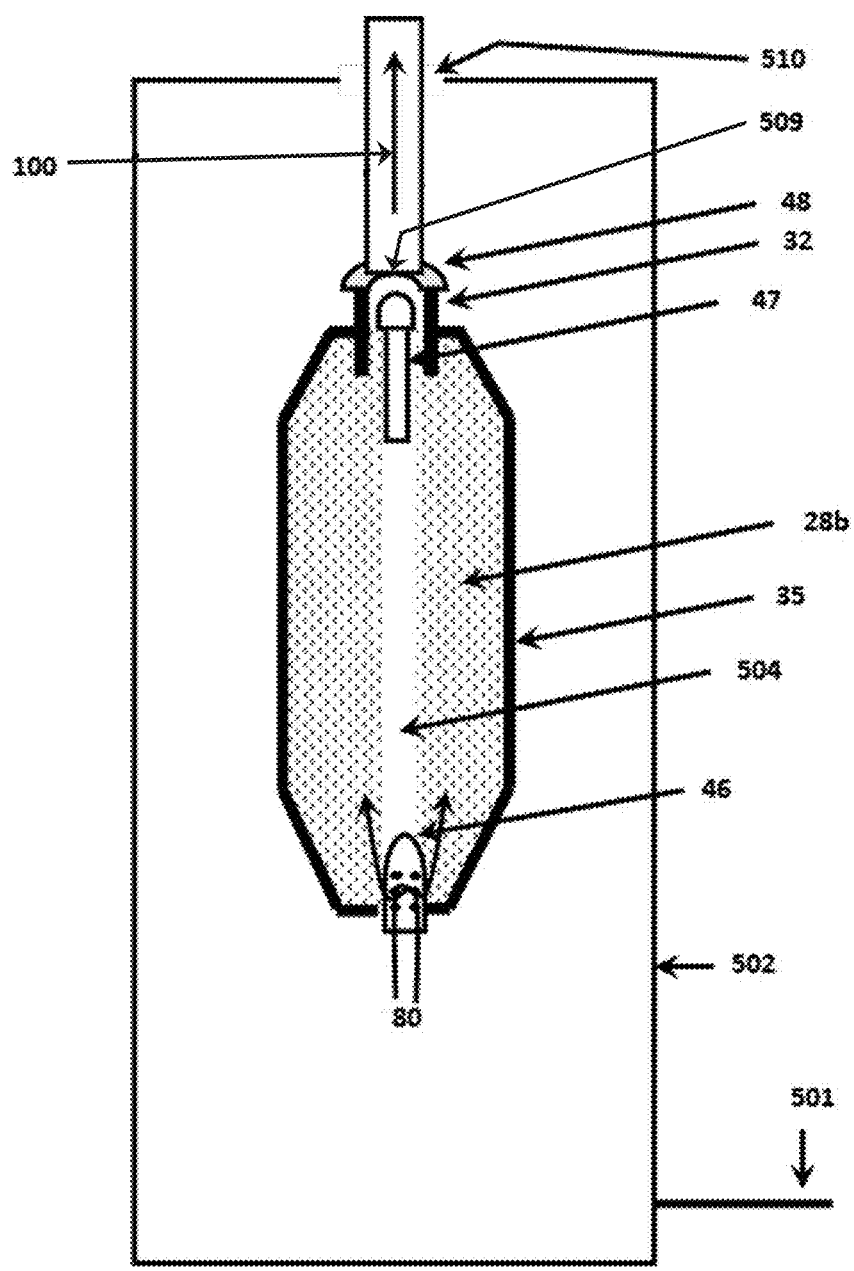
FIG. 5G illustrates a glazed soot preform, a top plug and a porous bottom plug in a furnace, in accordance with an embodiment of the present disclosure.
Figure 5H:
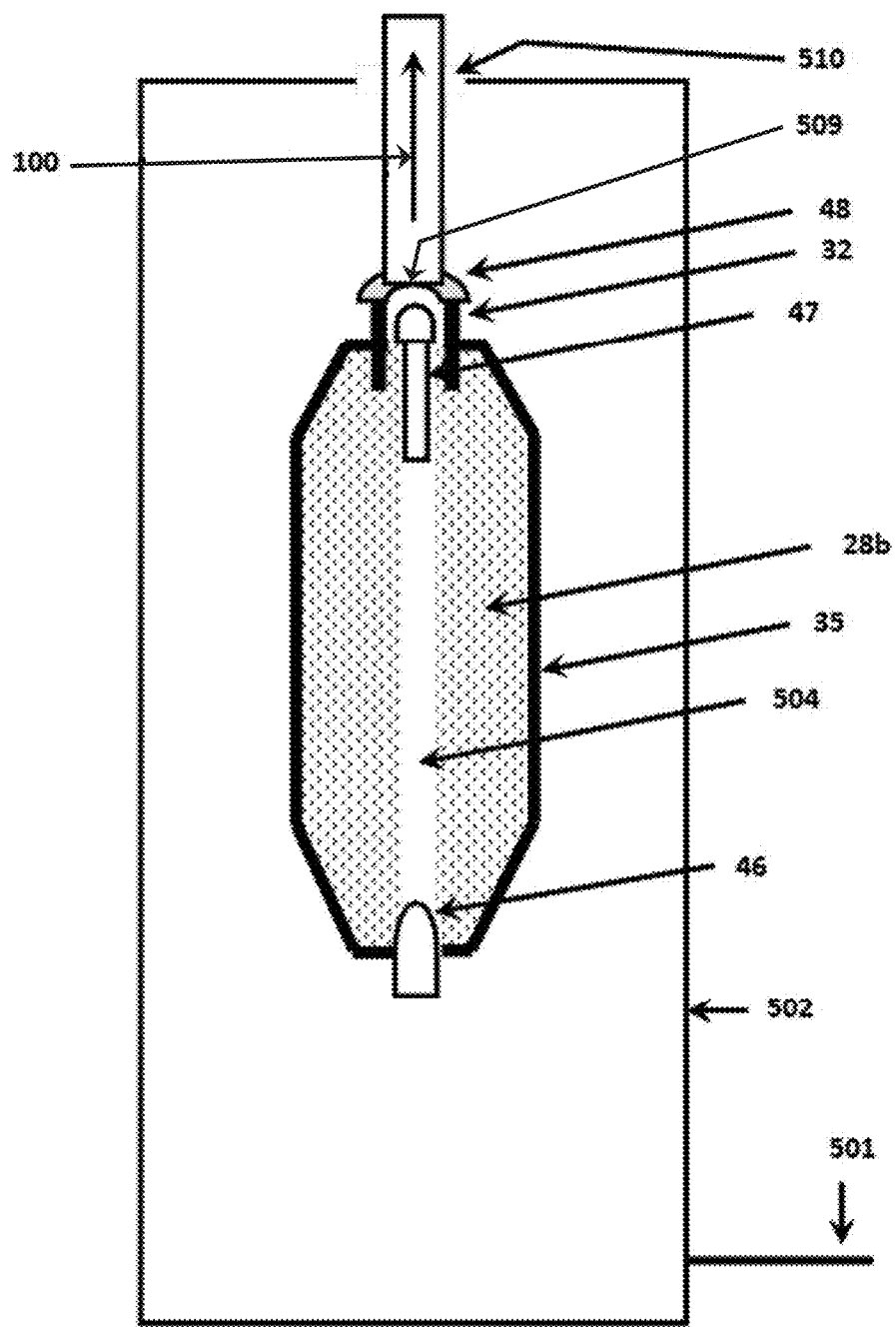
FIG. 5H illustrates a glazed soot preform, a top plug and a non-porous bottom plug in a furnace, in accordance with an embodiment of the present disclosure.

As shown in FIGS. 5F and 5G, partially sintering soot preform 28 may seal porous bottom plug 46 in glazed soot preform 28*b*. In contrast to FIG. 5F, FIG. 5G includes top plug 47 which is fitted into centerline hole 504. Top plug 47 is placed in centerline hole 504 at the end of glazed soot preform 28*b* proximal to handle 32. Top plug 47 may be sized such that, when vacuum 100 is applied, gases pass between porous bottom plug 46, glazed preform 28*b*, and top plug 47. FIG. 5G also shows gas flow 80 from furnace 502 through porous bottom plug 46, into centerline hole 504, and into soot preform 28*b* when vacuum 100 is applied to centerline hole 504. FIG. 5H similarly illustrates the sealing of bottom plug 46 when a solid, non-porous bottom plug 46 is used.

Figure 7A:
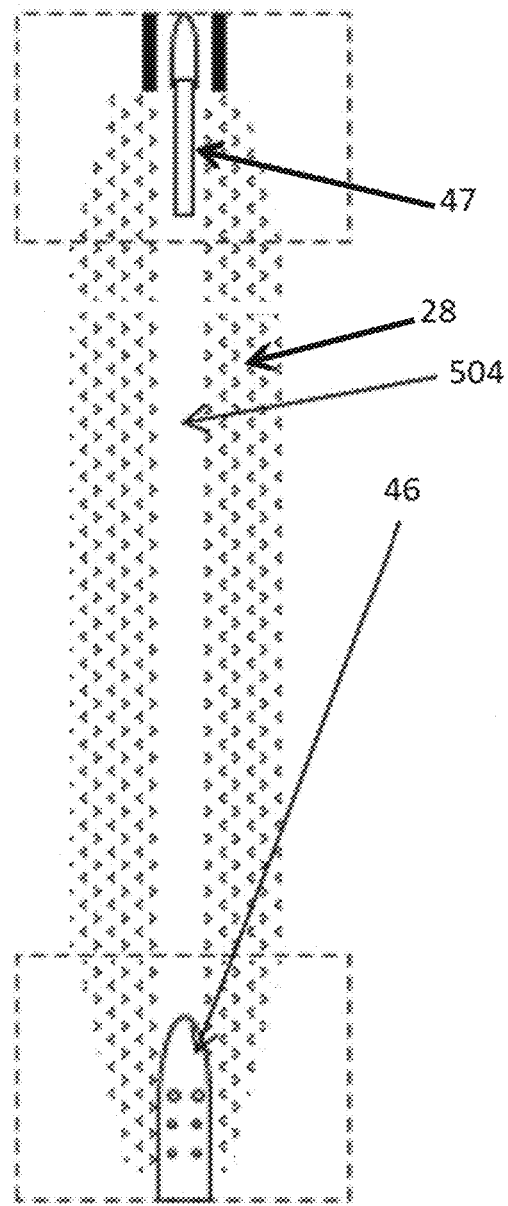
FIG. 7A illustrates a soot preform in accordance with an embodiment of the present disclosure.
Figure 7B:
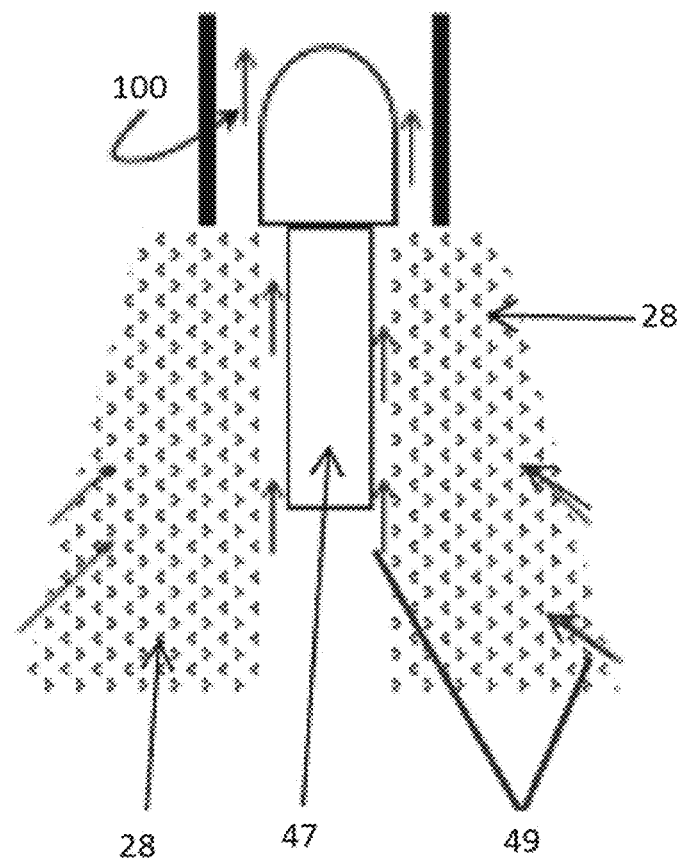
FIG. 7B illustrates gas flow through a soot preform and around a top plug in accordance with an embodiment of the present disclosure.
Figure 7C:
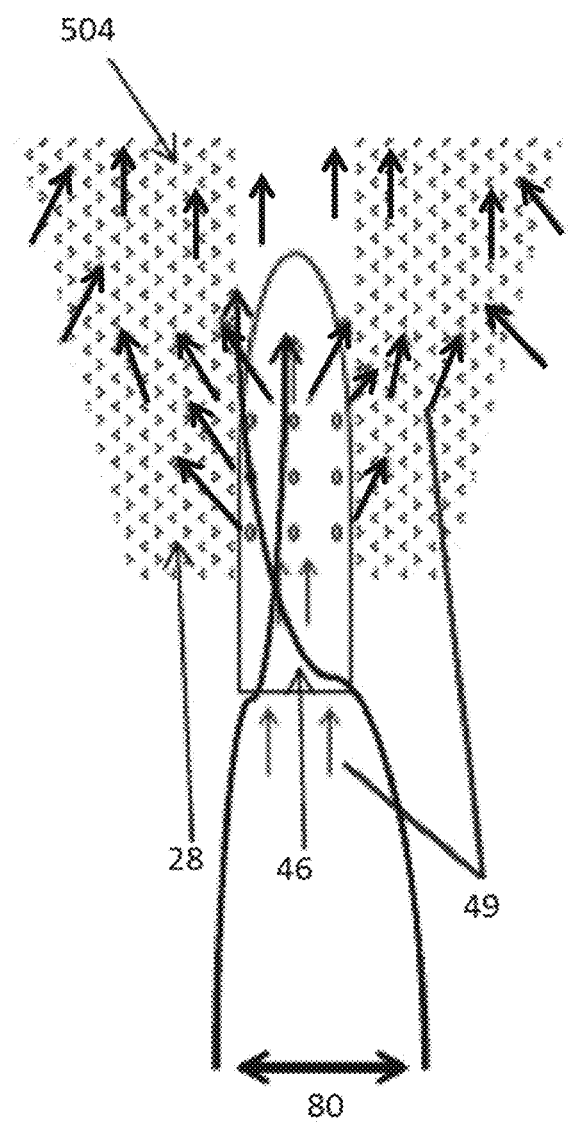
FIG. 7C illustrates gas flow through a soot preform and a porous bottom plug in accordance with an embodiment of the present disclosure.

FIGS. 7A-7C illustrate top plug 47 and bottom plug 46 in more detail. Initially, soot preform 28 is porous. Top plug 47 allows for drawing of vacuum 100 through handle 32. Bottom plug 46 allows for gas to be drawn through centerline hole 504, which enables rapid heating of inside surfaces of soot preform 28 adjacent to centerline hole 504. FIG. 7B illustrates gas flow 49, through soot preform 28 and around top plug 47 when vacuum 100 is applied. FIG. 7C illustrates gas flow 49 through soot preform 28, through openings in bottom plug 46, and through centerline hole 504 when vacuum 100 is applied. FIG. 7C also illustrates gas flow 80 from furnace 502 through porous bottom plug 46, into centerline hole 504, and into soot preform 28 when vacuum 100 is applied to centerline hole 504.

Figure 8A:
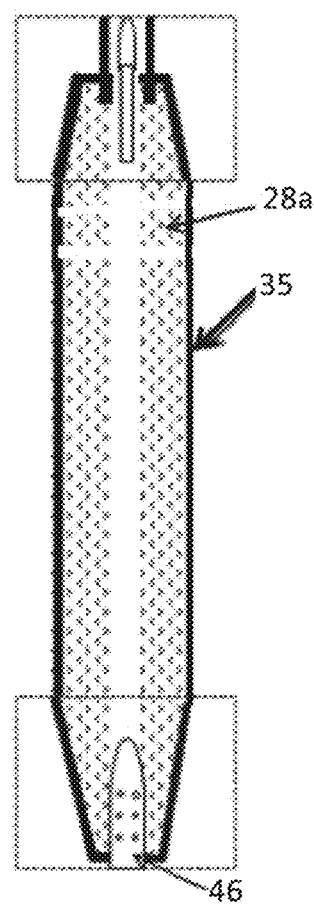
FIG. 8A illustrates a glazed soot preform in accordance with an embodiment of the present disclosure.
Figure 8B:
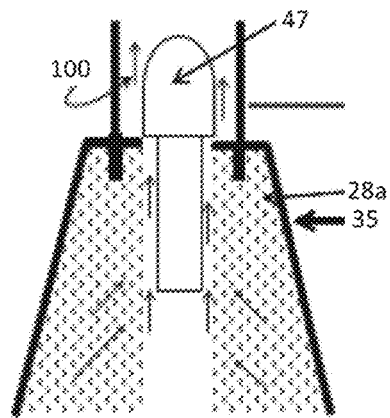
FIG. 8B illustrates gas flow through a glazed soot preform, and around a top plug, in accordance with an embodiment of the present disclosure.
Figure 8C:
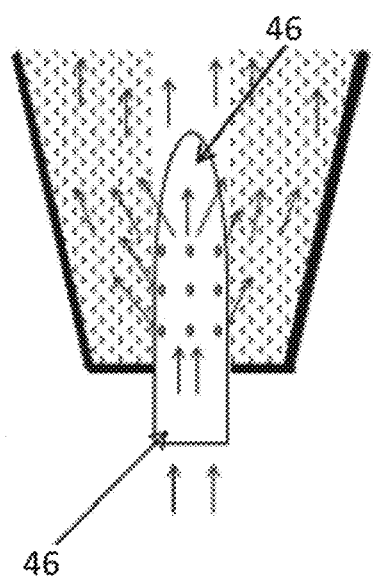
FIG. 8C illustrates gas flow through a glazed soot preform, and through a porous bottom plug, in accordance with an embodiment of the present disclosure.
Figure 8D:
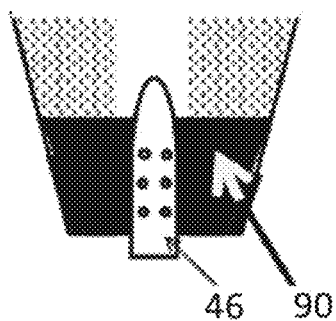
FIG. 8D illustrates a glazed soot preform having a consolidated lower portion in accordance with an embodiment of the present disclosure.

FIGS. 8A-8D illustrate glazing of the outer surface of soot preform 28, as well as closing of the openings in bottom plug 46 by consolidation of a lower portion of glazed soot preform 28*b*. In FIG. 8A glazed layer 35 is formed on the outside surface of glazed soot preform 28*b*. As shown in FIGS. 8B and 8C, the outside surface of glazed soot preform 28*b* is sealed and gas flow 49 passes through the openings in bottom plug 46, into glazed soot preform 28*b*, through centerline hole 504, and around top plug 47. As shown in FIG. 8D, further sintering of glazed soot preform 28*b* consolidates a lower portion 90 of glazed soot preform 28*b*, and closes the openings in bottom plug 46. The closing of the openings in bottom plug 46 may further enable drawing of vacuum 100 through centerline hole 504, which in turn pulls gas through centerline hole 504 and reduces the amount of gas that can be trapped in the pores of glazed soot preform 28*b*.

Figure 5I:
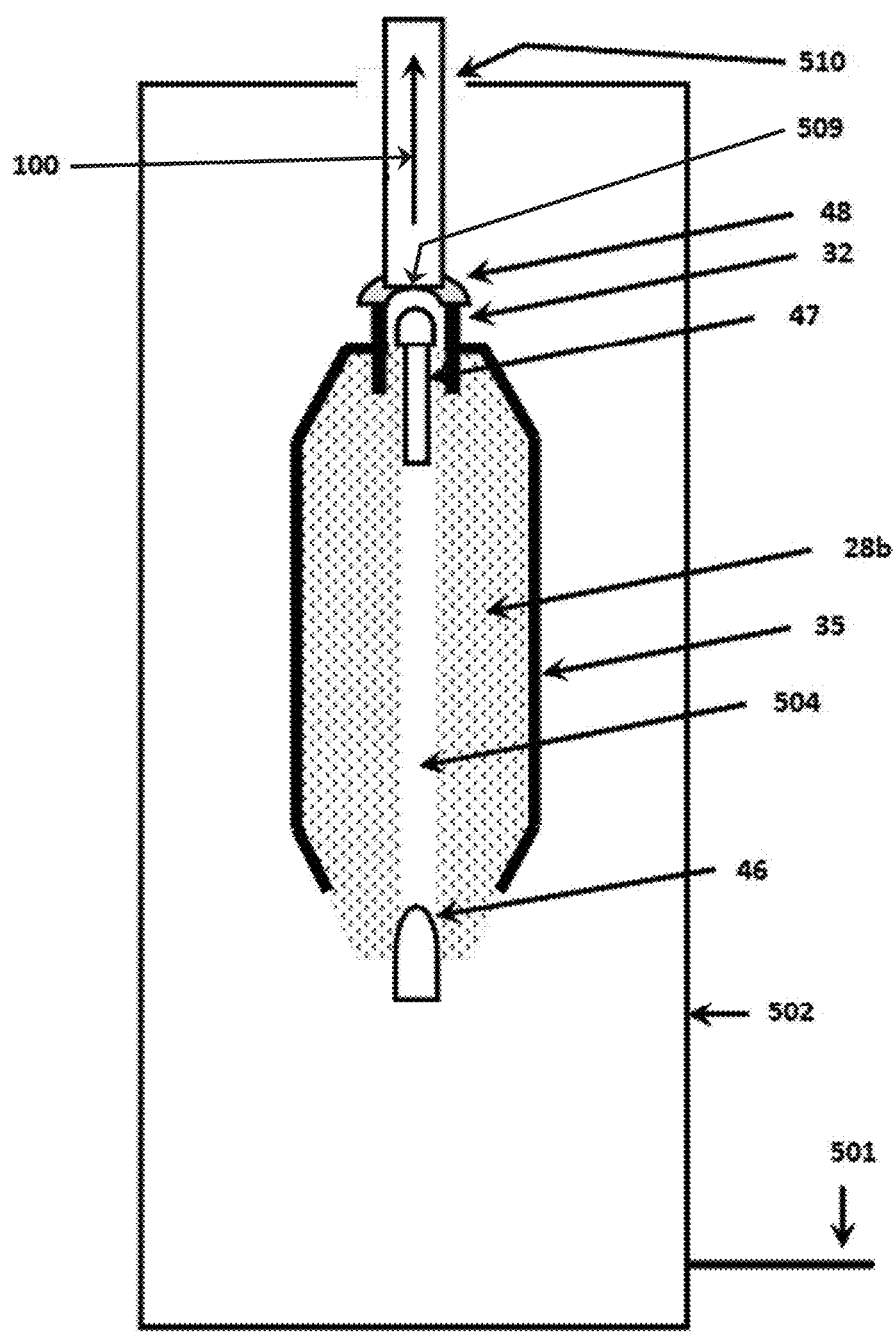
FIG. 5I illustrates a glazed soot core preform, a top plug and a non-porous bottom plug in a furnace, in accordance with an embodiment of the present disclosure.

FIG. 5I illustrates an alternate embodiment in which glazed layer 35 extends from the end of glazed soot preform 28*b* proximal to handle 32 to a distance from bottom plug 46. The distance between bottom plug 46 and glazed layer 35 is a bottom unglazed portion of glazed soot preform 28*b*. In FIG. 5I, when vacuum 100 is applied, gases in furnace 502 may be drawn through the bottom unglazed portion of glazed soot preform 28*b* near bottom plug 46, further aiding in processing of glazed soot preform 28*b*.

According to an embodiment of the present disclosure, and as illustrated in FIG. 5B, soot preform 28 may be heated with a flame or other thermal source, such as, but not limited to, a laser or plasma, prior to or after removal from mandrel 30 to form glazed layer 35. Glazed layer 35 may cover all of, or a portion of, the outside surface of glazed soot preform 28 *b*. Glazed layer 35 may be formed by applying heat, such as in the form of flame 37, from burner 34. Applying heat from burner 34 may include reducing or terminating the supply of chemical reactants to burner 34 which were used to form soot 36. Similar to the deposition process, glazed layer 35 may be formed by rotating and translating soot preform 28 and mandrel 30, or, alternatively, by rotating soot preform 28 and mandrel 30 and translating burner 34 along a length of soot preform 28 and a portion of handle 32. Glazed layer 35 may be less than about 3.0% of the thickness of soot preform 28, or alternatively, less than about 1.0% of the thickness of soot preform 28.

At step 16, vacuum 100 is applied to centerline hole 504 of glazed soot preform 28*b* and gas residing in the pores of glazed soot preform 28*b* is evacuated.

Figure 5J:
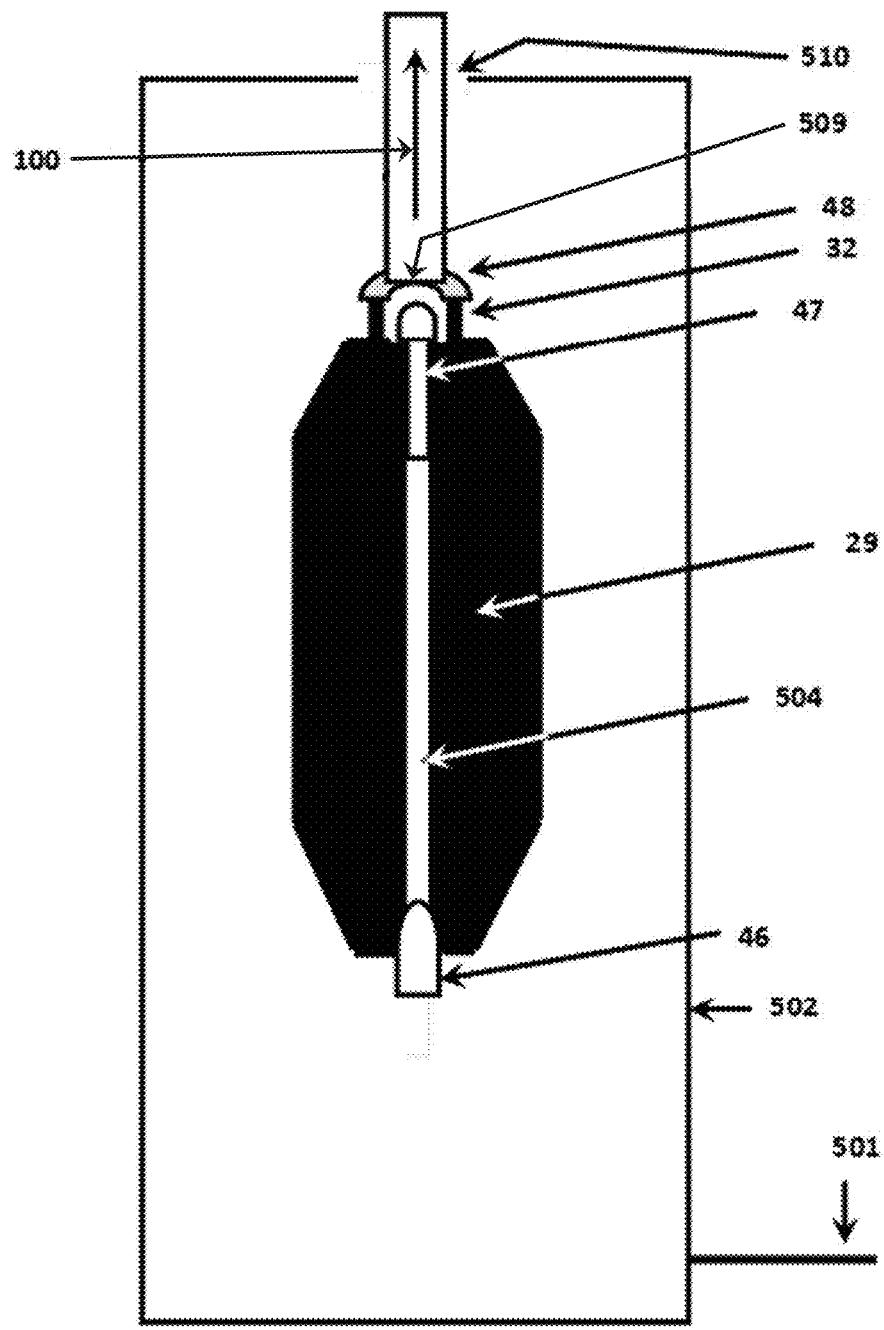
FIG. 5J illustrates a glass preform, a top plug and a non-porous bottom plug in a furnace, in accordance with an embodiment of the present disclosure.

At step 18, centerline hole 504 is maintained under vacuum and the remainder of soot preform 28 may be sintered to provide a glass preform 29 suitable for drawing into an optical fiber by increasing the furnace temperature to about 1,600° C. The temperature ramp rate may be greater than about 15° C. per minute, or greater than about 25° C. per minute, or even greater than about 50° C. per minute. These high ramp rates are in contrast to temperature ramp rates of less than about 10° C./minute that are typically used in a sintering process in which a vacuum is not applied. Typical temperature ramp rates are well below about 10° C./minute, and can be less than about 3.0° C./minute, in a sintering process in which a vacuum is not applied. Soot preform 28*b* may be maintained at a sintering temperature for a period of about 30 minutes to about 4.0 hours. Vacuum 100 facilitates drawing of gas through centerline hole 504 and in contact with an inside surface of glazed soot preform 28*b* while also evacuating gas from the pores of soot preform 28*b*. As gas in the pores of soot preform 28*b* is evacuated by vacuum 100, the amount of gas that may be trapped and expanded during sintering is reduced or eliminated. This evacuation of gas from soot preform 28*b* reduces risks of seed or bubble formation, which further facilitates increased ramp rates. As such, the densification process at high temperature ramp rates disclosed herein yields a substantially void-free glass. FIG. 5J illustrates a solid, void-free glass preform 29 in which centerline hole 504 has been sealed from the external atmosphere by top plug 47 and bottom plug 46.

At step 20 glass preform 29 is heated in order to allow interstitial gas to diffuse out of the glass preform 29. As formed in accordance with methods described herein, the amount of gas that may be trapped and expanded during sintering is reduced or eliminated. Consequently glass preform 29 may be placed in a holding oven for gas diffusion for significantly shorter periods of time than glass preforms formed using conventional techniques. The gas diffusion period of embodiments of the present disclosure may be reduced by a factor greater than about 4, or by a factor greater than about 8, or even by a factor greater than about 16, as compared to gas diffusion periods of conventional techniques. In instances where there is no interstitial gas in glass preform 29, glass preform 29 may not need to be placed in a holding oven.

For example, a glass preform weighing about 3,000 grams, having a length of about 1.0 meter, and a diameter of about 7.0 cm to about 12 cm was formed in accordance with a conventional technique in which a vacuum was not applied to the centerline hole. It took about 4.0 hours to about 8.0 hours in a holding oven set at about 1,000° C. for the interstitial gas to diffuse out of the glass preform. Gas diffusion out of a glass preform of similar dimensions formed in accordance with embodiments of the present disclosure was complete after a period of less than about 1.0 hour in a holding oven. For other glass preforms of similar dimensions formed in accordance with embodiments of the present disclosure, diffusion of interstitial gas occurred without placing the glass preform in a holding oven.

In another example, a glass preform weighing about 45 kilograms, having a length of about 1.5 meters, and a diameter of about 14 cm, was formed in accordance with a conventional technique in which a vacuum was not applied to the centerline hole. It took about 50 hours in a holding oven set at about 1,000° C. for the interstitial gas to diffuse out of the glass preform. In contrast, gas diffusion out of a glass preform of similar dimensions formed in accordance with embodiments of the present disclosure was complete in less than about 10 hours in a holding oven. For other glass preforms of similar dimensions formed in accordance with embodiments of the present disclosure, gas diffusion was accomplished in less than about 5 hours in a holding oven. For still other glass preforms of similar dimensions formed in accordance with embodiments of the present disclosure, gas diffusion occurred without placing the glass preform in a holding oven.

As described above, soot preform 28 may include more than a single segment. As such, it should be appreciated that modifications to the process described herein may be made to accommodate for multiple soot preform segments. For example, soot preform 28 may include a glass core cane and a soot overclad segment deposited on the glass core cane. Vacuum 100 may be applied to the soot overclad segment to evacuate gas from the pores of the soot overclad segment. As another example, soot preform 28 may include a glass core cane and a soot overclad sleeve with the glass core cane being inserted into the centerline hole of the soot overclad sleeve. Prior to sintering, an annulus exists between the glass core cane and the soot overclad sleeve, and vacuum 100 may be applied to the annulus to evacuate gas from the pores of the soot overclad segment.

Figure 6B:
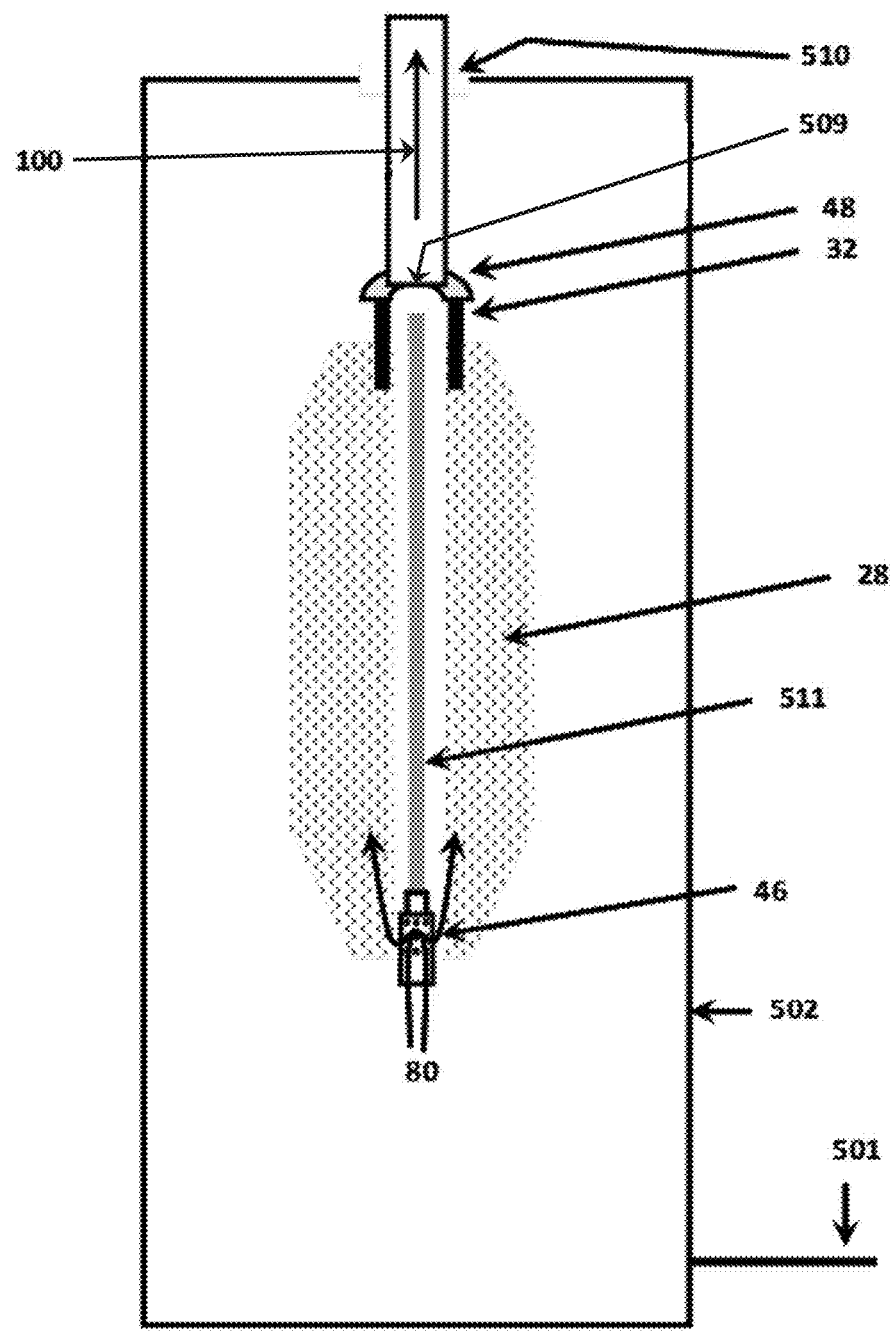
FIG. 6B illustrates a soot preform having a core cane and a soot overclad segment and a porous bottom plug in a furnace, in accordance with an embodiment of the present disclosure.
Figure 6C:
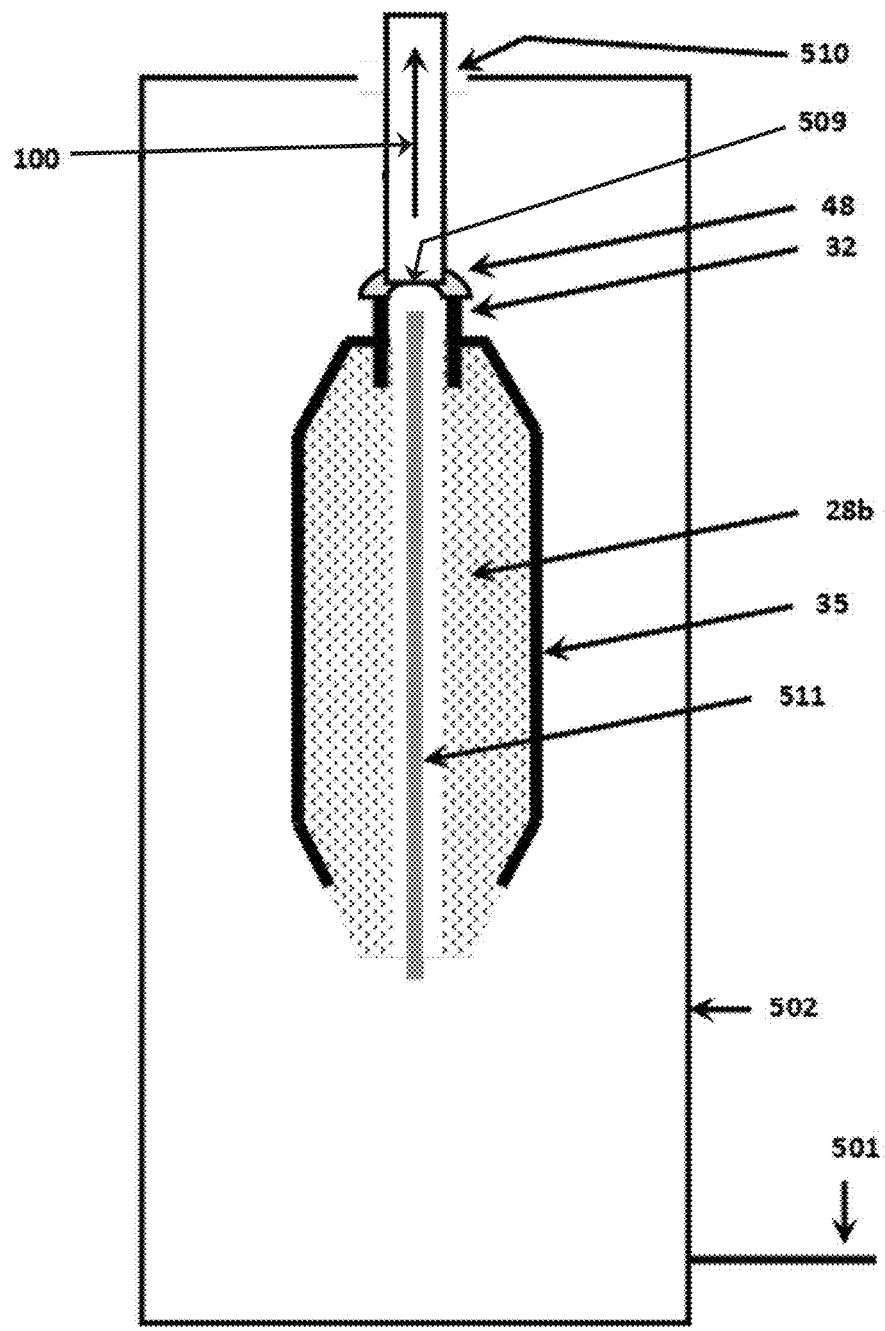
FIG. 6C illustrates a glazed soot preform having a core cane and a soot overclad segment in a furnace, in accordance with an embodiment of the present disclosure.

FIG. 6A illustrates a soot preform 28 with a glass core cane 511 suspended in a muffle furnace 502 by handle 32. Handle 32 is mated to vacuum connection 509. Seal 48 is formed between vacuum connection 509 and an upper portion of handle 32. Furnace 502 includes a furnace gas exhaust vent 510. Furnace 502 also includes a furnace gas inlet 501 through which are supplied gases, for example, but not limited to, chlorine, helium, nitrogen, oxygen, argon and other gases used in the treatment of soot preforms. FIG. 6B further illustrates a porous bottom plug 46 as used with soot preform 29 having a glass core cane 511, and FIG. 6C further illustrates soot preform 28b with glass core cane 511 and a bottom unglazed portion.

At step 22 glass preform 29 is drawn into an optical fiber. Where glass preform 29 is formed from a single segment soot preform, glass preform 29 can be drawn into glass core canes to be used as part of an optical fiber preform. Where glass preform 29 is formed from a multiple segment soot preform, glass preform 29 can be drawn into optical fiber. The optical fiber may have a diameter of about 125 μm.

Where applying a vacuum is discussed herein, vacuum 100 at about 0.01 atm to about 0.25 atm may be applied to centerline hole 504.

Figure 2:
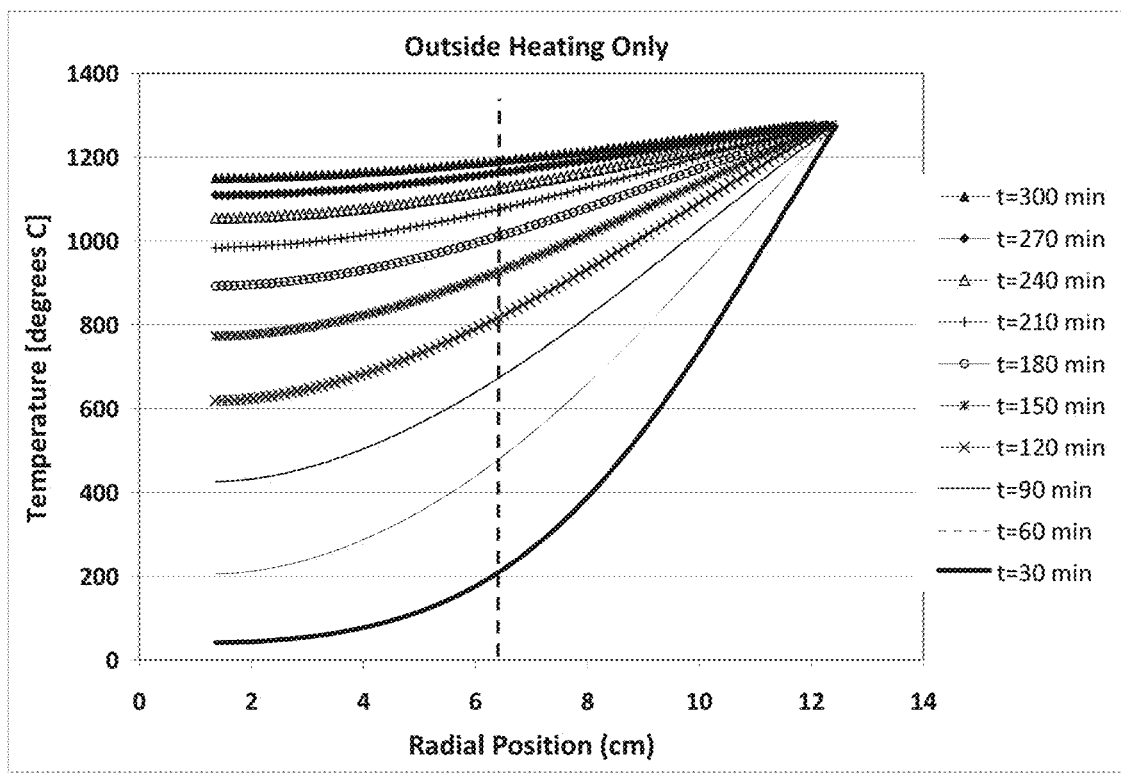
FIG. 2 is a graph of temperature in degrees Celsius versus radial position in centimeters for a soot preform that has a radius of about 12 cm and is heated from the outside of the preform.

FIG. 2 is a graph of temperature in degrees Celsius versus radial position in centimeters for a soot preform that has a radius of about 12 cm and is heated from the outside of the preform at a temperature of about 1,275° C. The curves on the graph are in the same order, from top to bottom, as the labels in the legend at the right of the figure. FIG. 2 shows that while the outside surface of the soot preform reaches about 1275° C. after about 30 minutes of heating, the surface of the soot preform adjacent to the centerline hole only reaches about 1150° C. after about 300 minutes of heating. The approximate center of the soot preform, indicated by the vertical dashed line in FIG. 2, also reaches a temperature of less than about 1200° C. after about 300 minutes of heating.

Figure 4:
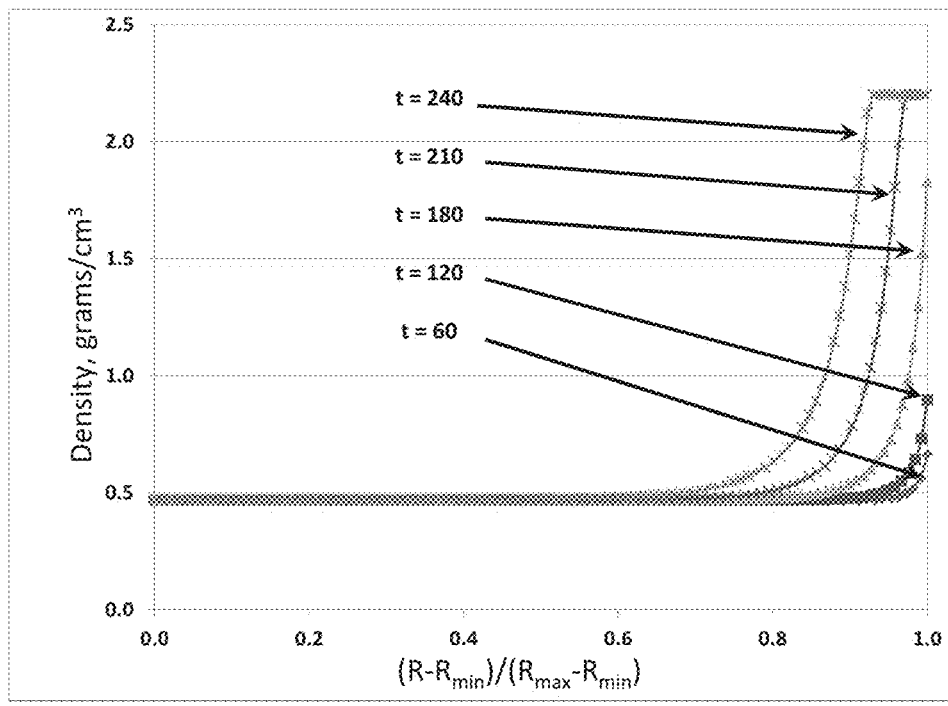
FIG. 4 is a radial density profile in grams/cm$^3$ at different times, in minutes, during sintering of the preform as of FIG. 2.

FIG. 4 is a radial density profile in grams/cm$^3$ at different times, in minutes, during a sintering process for the same soot preform as in FIG. 2. The profile plots of density versus $(R-R_{min})/(R_{max}-R_{min})$, where R is the radial location, $R_{min}$ is the radial location corresponding to the inside of the soot segment and $R_{max}$ is the radial location corresponding to the outside of the soot segment. FIG. 4 shows that, while the outside of the preform is completely sintered after about 210 minutes of heating, the inside of the preform has a significantly lower density.

Figure 3:
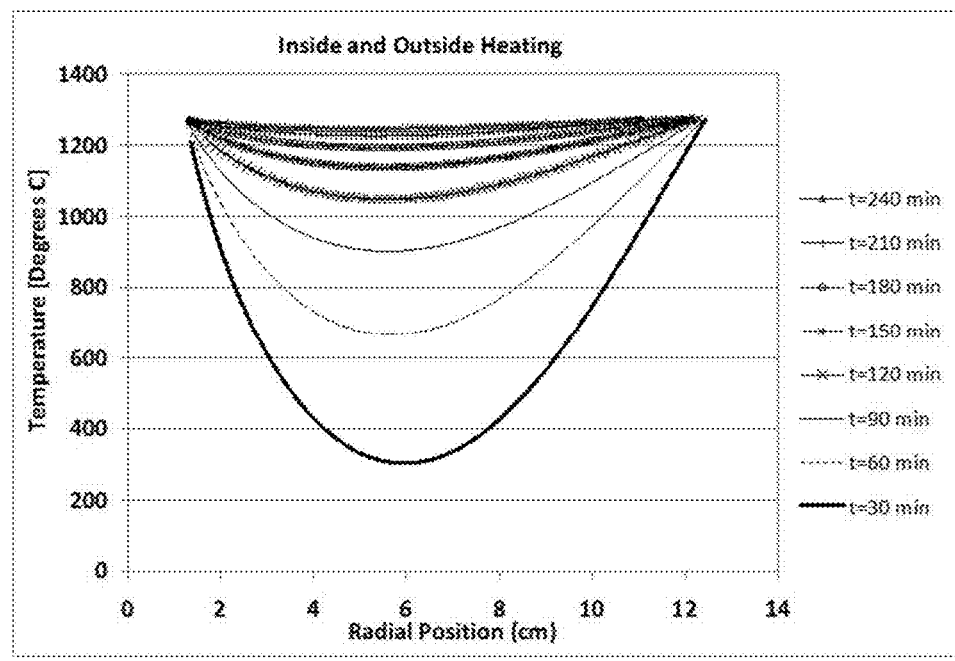
FIG. 3 is a graph of temperature in degrees Celsius versus radial position in centimeters for a soot preform that has a radius of about 12 cm and is heated from both the inside and the outside of the preform.

In contrast, FIG. 3 is a graph of temperature in degrees Celsius versus radial position in centimeters for a soot preform that has a radius of about 12 cm and is heated from both the inside and the outside of the preform. The curves on the graph are in the same order, from top to bottom, as the labels in the legend at the right of the figure. FIG. 3 illustrates that, when both the inside and outside of a soot preform are heated in accordance with embodiments of the present disclosure, heating of the entire soot preform occurs in a shorter period of time as compared to heating only from the outside of the preform. As shown in FIG. 3, the outside of the soot preform reaches about 1300° C. after about 30 minutes of heating, the inside of the soot preform reaches about 1275° C. after about 90 minutes of heating, and the approximate center of the soot preform reaches about 1275° C. between about 210 minutes and about 240 minutes of heating. Comparing the data at the approximate center of the soot preform in FIGS. 2 and 3 indicates that embodiments of the present disclosure reduce the period for consolidation of the soot preform by about 40 to about 60%.

Embodiments of the present disclosure significantly reduce process time associated with heating, drying, doping and sintering soot preforms. The period for gas diffusion from the glass preform is also significantly reduced. Drawing of vacuum 100 through centerline hole 504 pulls furnace gas through centerline hole 504 and reduces the time for processing soot preforms to form glass preforms for subsequent use in the manufacture of optical fibers. As discussed above, drawing vacuum 100 through centerline hole 504 may facilitate flow of heat and/or drying agent through the soot preform to thereby heat and/or dry the soot preform from both the inside and the outside, which, in turn, reduces the period for heating and/or drying the soot preform. Similarly, drawing vacuum 100 through centerline hole 504 may facilitate flow of the doping agent through the soot preform to thereby dope the soot preform from both the inside and the outside, which, in turn, reduces the period for doping the soot preform. And drawing of vacuum 100 through centerline hole 504 also enables rapid heating of both the inside and the outside of the soot preform, which, in turn, increases the overall heating rate of soot preform 28.

In another embodiment, vacuum is applied on the preform centerline through the handle, it is possible to pull the furnace gas through the centerline, thereby doping the soot preform from both inside and outside, thus the preform is doped much more rapidly than a preform heated without vacuum applied to the centerline. As such, the overall costs of producing optical fiber blanks and optical fiber from such blanks is also reduced.

EXAMPLES

Example 1

About 3,000 grams of germania-doped $SiO_2$ (about 0.5 g/cc density) soot was deposited in a lathe using an outside vapor deposition process to form a germania ($GeO_2$)-doped $SiO_2$ soot preform. The soot was deposited onto a 1.0 m long×9.0 mm diameter removable alumina mandrel having an integral handle. The soot preform had a step index profile of about 7.5 weight percent $GeO_2$ and a core/cladding ratio of about 0.33. The alumina mandrel was removed after soot deposition leaving a centerline hole in the soot preform. The soot preform remained attached to the integral handle.

A solid top plug and a solid bottom plug were inserted into the centerline hole of the soot preform. The soot preform was placed in a quartz muffle furnace zone at a pressure of one atmosphere absolute and at a temperature of about 1,025° C. The soot preform was dried for about 130 minutes in an atmosphere of about 97.5 percent helium and about 2.5 percent chlorine at a flow rate of about 20 SLPM (standard liters per minute). The furnace was purged for about 60 minutes with about 20 SLPM of helium, and the flow rate and furnace atmosphere was about 100% helium at about 20 SLPM throughout the remainder of the process (except where otherwise noted). The soot preform was then down-driven at about 50 mm per minute through a hot zone set at about 1,500° C. (resulting in an increase in temperature of the foot preform of about 25° C. per minute), followed by up-driving the preform at about 200 mm per minute into the furnace zone. Following this step, vacuum at about 10 to about 50 torr (absolute pressure) was applied to the centerline hole through the integral handle. The vacuum was maintained throughout the remainder of the consolidation process. The soot preform was then down-driven at 50 mm per minute through a hot zone set at about 1,500° C. (resulting in an increase in temperature of the soot preform of about 25° C. per minute), followed by up-driving the soot preform at about 200 mm per minute into the furnace zone a total of two more times. A glaze layer was formed on the outside of the soot preform. The soot preform was then down-driven at about 5 mm per minute through a hot zone set at about 1,500° C. in about 2 SLPM of helium in order to densify the soot preform into a consolidated, void-free, glass preform with a centerline hole having a diameter of about 2.0 mm to about 5.0 mm.

The glass preform was cooled to room temperature without being moved to a holding oven. The glass preform was then placed in a redraw furnace set at approximately 1,850° C., and the glass preform was redrawn into glass canes having lengths of about 1.0 meters and diameters of about 7.5 mm to about 11 mm. The glass canes were solid and void-free and had no centerline holes. The glass canes had refractive index profiles identical to glass canes formed using conventional processes. However, the processing period for the glass canes was reduced by about 40-60% as compared to the processing period for glass canes formed using conventional processes.

Example 2

A soot preform was formed as follows: a core cane having a length of about 1.0 meter and a diameter of about 11 mm formed in accordance with the process of Example 1 was placed on a lathe and about 4,100 grams of $SiO_2$ (about 0.5 g/cc density) soot was deposited using an outside vapor deposition process to form a soot overclad. The soot preform was placed in a quartz muffle furnace zone at a pressure of one atmosphere absolute and at a temperature of about 1,025° C. The soot preform was dried for about 120 minutes in an atmosphere of about 97.5 percent helium and about 2.5 percent chlorine at a flow rate of about 20 SLPM. The furnace was purged for about 60 minutes with about 20 SLPM of helium, and the flow rate and furnace atmosphere was about 100% helium at about 20 SLPM throughout the remainder of the process (except where otherwise noted). The soot preform was then down-driven at about 5 mm per minute through a hot zone set at about 1,500° C. in order to densify the soot into a consolidated void-free glass preform.

The glass preform was then placed in a holding oven set at about 1,000° C. with a purge flow of about 100% argon. About 25 km of about 125 μm optical fiber was drawn from the glass preform. There were no voids in the core cane, core cane/overclad interface, soot overclad, draw root, or resulting optical fiber. The optical fiber was strength tested at 100 kpsi (kpsi=thousand pounds per square inch) and exhibited the following optical spectral properties: 1310 nm (0.350 dB/km), 1380 nm (0.346 dB/km) and 1550 nm (0.198 dB/km). The MFD (mode field diameter) was 8.84 μm at 1310 nm and 10.15 μm at 1550 nm.

Example 3

A soot preform was formed as follows: about 2,050 grams of $SiO_2$ (about 0.5 g/cc density) soot was deposited in a lathe using an outside vapor deposition process to form a $SiO_2$ soot preform, the deposition being done on a 1.0 meter long×9.0 mm diameter removable alumina mandrel having an integral handle. The alumina mandrel was removed after soot deposition leaving a centerline hole in the soot preform. The soot preform remained attached to the integral handle. A core cane having a length of about 1.0 and a diameter of about 7.5 mm formed in accordance with the process of Example 1 was inserted into the centerline hole of the soot preform.

The soot preform was placed in a quartz muffle furnace zone at a pressure of one atmosphere absolute and at a temperature of about 1,025° C. The soot preform was dried for about 130 minutes in an atmosphere of about 97.5 percent helium and about 2.5 percent chlorine at a flow rate of about 20 SLPM. The furnace was purged for about 60 minutes with about 20 SLPM of helium, and the flow rate and furnace atmosphere was about 100% helium at about 20 SLPM throughout the remainder of the process (except where otherwise noted). The soot preform was then down-driven at about 50 mm per minute through a hot zone set at about 1,500° C. (resulting in an increase in temperature of the foot preform of about 25° C. per minute), followed by up-driving the preform at about 200 mm per minute into the furnace zone. Following this step, vacuum at about 10 to about 50 torr (absolute pressure) was applied to the centerline hole through the integral handle. The vacuum was maintained throughout the remainder of the consolidation process. The soot preform was then down-driven at 50 mm per minute through a hot zone set at about 1,500° C. (resulting in an increase in temperature of the soot preform of about 25° C. per minute), followed by up-driving the soot preform at about 200 mm per minute into the furnace zone a total of two more times. A glaze layer was formed on the outside of the soot preform. The soot preform was then down-driven at about 5 mm per minute through a hot zone set at about 1,500° C. in about 2 SLPM of helium in order to densify the soot preform into a consolidated, void-free, glass preform.

This glass preform was cooled to room temperature without being moved to a holding oven. The glass preform was then placed in a redraw furnace set at approximately About 46 km of about 125 μm optical fiber was drawn from the glass preform. There were no voids in the core cane, core cane/overclad interface, soot overclad, draw root, or resulting optical fiber. The optical fiber was strength tested at 100 kpsi and exhibited the following optical spectral properties: 1310 nm (0.356 dB/km), 1380 nm (0.317 dB/km) and 1550 nm (0.198 dB/km). The MFD was 8.68 μm at 1310 nm and 10.08 μm at 1550 nm.

What is claimed is:

1. A method for forming an optical glass preform comprising:
    forming a first soot preform having a centerline hole, the first soot preform having a thickness and an outside surface, the first soot preform comprising soot;
    placing the first soot preform in a furnace;
    glazing the first soot preform to form a glazed soot preform, the glazing comprising:
        partially sintering the first soot preform to form a closed porosity layer on the outside surface, the closed porosity layer being less than an entirety of the first soot preform such that a remainder of the entirety of the first soot preform is not sintered; and
        applying a vacuum to the centerline hole of the glazed soot preform to evacuate gas residing in pores of the glazed soot preform.

2. The method of claim 1, wherein the forming the first soot preform comprises depositing soot on a mandrel inserted through a handle.

3. The method of claim 1, wherein the forming the first soot preform comprises collapsing a soot overclad on a glass core cane.

4. The method of claim 1, further comprising:
    heating the first soot preform; and
    treating the first soot preform with a drying agent, the treating the first soot preform comprising:
        flowing the drying agent from the furnace into the centerline hole of the first soot preform, wherein the drying agent is selected from the group consisting of chlorine-containing compounds, carbon monoxide, and combinations thereof.

5. The method of claim 1, further comprising:
    heating the first soot preform or the glazed soot preform; and
    doping the first soot preform or the glazed soot preform with a doping agent, the doping comprising:
        flowing the doping agent from the furnace into the centerline hole of the first soot preform or the glazed soot preform,
        wherein the doping agent is selected from the group consisting of chlorine-containing compounds, fluorine-containing compounds, carbon monoxide, and combinations thereof.

6. The method of claim 1, wherein the partially sintering the first soot preform comprises heating the furnace with the first soot preform therein to about 1600° C. at a ramp rate of greater than about 15° C. per minute under vacuum.

7. The method of claim 1, further comprising sintering the glazed soot preform under vacuum.

8. The method of claim 1, wherein the furnace has a furnace pressure $F_p$ outside of the glazed soot preform, and the pressure inside the glazed soot preform is less than or equal to about 0.25 $F_p$ when the vacuum is applied to the centerline hole of the glazed soot preform.

9. The method of claim 1, further comprising:
    flowing gas from the furnace into the centerline hole of the glazed soot preform at a flow rate of greater than about 100 sccm when applying the vacuum.

10. The method of claim 1, wherein the closed porosity layer has a thickness less than 25 % of the thickness of the first soot preform.

* * * * *

UNITED STATES PATENT AND TRADEMARK OFFICE
CERTIFICATE OF CORRECTION

| | | |
|---|---|---|
| PATENT NO. | : 11,554,978 B2 | Page 1 of 1 |
| APPLICATION NO. | : 14/546020 | |
| DATED | : January 17, 2023 | |
| INVENTOR(S) | : Dana Craig Bookbinder et al. | |

It is certified that error appears in the above-identified patent and that said Letters Patent is hereby corrected as shown below:

On the Title Page

On the page 2, in item (56), in Column 1, in "U.S. Patent Documents", Line 7, after "Lawrence" insert -- et al. --.

On the page 2, in Column 2, under "Other Publications", Line 1, delete "Germaniun," and insert -- Germanium, --.

On the page 2, in Column 2. under "Other Publications", Line 4, delete "Cogniolate," and insert -- Cognolato, --.

In the Claims

In Column 14, Line 38, in Claim 10, delete "25 %" and insert -- 25% --.

Signed and Sealed this
Eighth Day of August, 2023

Katherine Kelly Vidal
*Director of the United States Patent and Trademark Office*